(12) United States Patent
Kelly

(10) Patent No.: US 6,393,425 B1
(45) Date of Patent: May 21, 2002

(54) DIAGRAMMING REAL-WORLD MODELS BASED ON THE INTEGRATION OF A DATABASE, SUCH AS MODELS OF A COMPUTER NETWORK

(75) Inventor: Stephen T. Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/305,851

(22) Filed: May 5, 1999

(51) Int. Cl.$^7$ .............................. G06F 17/00; G06F 7/00
(52) U.S. Cl. ....................................................... 707/100
(58) Field of Search ............... 707/4, 7–10, 100–104.1, 707/200–206, 500–542; 709/220–224; 345/733–737, 738, 853–854, 969

(56) References Cited

U.S. PATENT DOCUMENTS

| | | | | |
|---|---|---|---|---|
| 4,656,603 A | * | 4/1987 | Dunn | 364/900 |
| 4,813,013 A | * | 3/1989 | Dunn | 364/900 |
| 5,019,961 A | * | 5/1991 | Addesso et al. | 364/192 |
| 5,581,610 A | * | 12/1996 | Hooshiari | 379/96 |
| 5,586,254 A | * | 12/1996 | Kondo et al. | 395/200.1 |
| 5,619,709 A | * | 4/1997 | Caid et al. | 395/794 |
| 5,754,831 A | * | 5/1998 | Berman | 395/500 |
| 5,809,282 A | * | 9/1998 | Cooper et al. | 700/49 |
| 5,845,270 A | * | 12/1998 | Schatz et al. | 706/11 |
| 5,924,111 A | * | 7/1999 | Huang et al. | 711/5 |
| 5,991,759 A | * | 11/1999 | Knoblock et al. | 707/10 |
| 6,023,699 A | * | 2/2000 | Knoblock et al. | 707/10 |
| 6,205,122 B1 | * | 3/2001 | Sharon et al. | 370/254 |
| 6,216,160 B1 | * | 4/2001 | Dichter | 709/221 |
| 6,225,999 B1 | * | 5/2001 | Jain et al. | 345/356 |
| 6,229,540 B1 | * | 5/2001 | Tonelli et al. | 345/356 |
| 6,324,576 B1 | * | 11/2001 | Newcombe et al. | 707/203 |

FOREIGN PATENT DOCUMENTS

JP     409200207 A   *   7/1997   ........... G06F/17/50

* cited by examiner

*Primary Examiner*—John Breene
*Assistant Examiner*—Pham Linh
(74) *Attorney, Agent, or Firm*—King & Spalding

(57) ABSTRACT

A facility automatically generates diagrams of system using a stored model of the system. For example, the facility employs a database storing a model of interconnected elements that represents a computer network system comprised of interconnected components. The facility receives user input as to what the user wishes to place in the diagram. By selecting a shape in the diagram and displaying options with respect to that shape, the facility queries the database and filters out only the elements logically connected to the selected shape. The user can then view such filtered elements to decide which elements to add to the figure. The facility then automatically adds shapes of such elements to the figure, with appropriate connections to the initial shape selected.

43 Claims, 20 Drawing Sheets

DIAGRAMMING REAL-WORLD MODELS BASED ON THE INTEGRATION OF A DATABASE, SUCH AS MODELS OF A COMPUTER NETWORK

CROSS-REFERENCE TO RELATED APPLICATION

This application is related to U.S. patent application Ser. No. 09/305,859 filed concurrently herewith, entitled "Updating Diagrams of Dynamic Representational Models of Dynamic Systems."

TECHNICAL FIELD

The present invention is directed to the field of diagramming models, and more particularly, to the field of software facilities for computer aided diagramming of models, such as computer network models.

BACKGROUND OF THE INVENTION

When attempting to communicate one's ideas, a picture may be worth move than a thousand words, particularly when trying to explain complex systems. Computers, and software running on these computers, have helped people explain and communicate their ideas more effectively than ever before, and diagramming or graphics software applications have helped people more readily create pictures of their ideas.

One particularly difficult idea to communicate effectively in words is the configuration of a computer network. As a result, diagrams have been used effectively to identify elements in a network and their related connections. Using a diagramming software application, a user laboriously and manually creates a diagram of the network. The user must create icons or shapes representing various elements in the network when such shapes do not exist. Some computer networks are extensive and complex, and thus require considerable user effort to create diagrams of them, let alone proofread and verify each element in the diagram.

Some computer software packages create and diagram information representing all elements of a computer network. Examples of such systems are Network Audit Technology by Kaspia Systems, Inc. and OpenView by Hewlett-Packard Corporation. These systems analyze a computer network to create a database that logically represents the various components in the network. These systems can then create a diagram of that network using the database. These systems, however, focus on developing a database that logically represents network elements, rather than of a diagram of the network. The diagram is typically so large and involves so much information that it often overwhelms the user. The user may well spend more time analyzing and editing the diagram to provide a useful picture of a portion of the network, than if the user were simply to use a diagramming software application to create the network picture.

BRIEF DESCRIPTION OF THE DRAWINGS

In the drawings, identical reference numbers identify similar elements or steps. For ease in identifying the discussion of any particular element or step, the most significant digit or digits in a reference number refer to the Figure number in which that element is first introduced (e.g., element 1104 is first introduced and discussed with respect to FIG. 11).

DETAILED DESCRIPTION OF ILLUSTRATED EMBODIMENTS OF THE INVENTION

Figure 1:
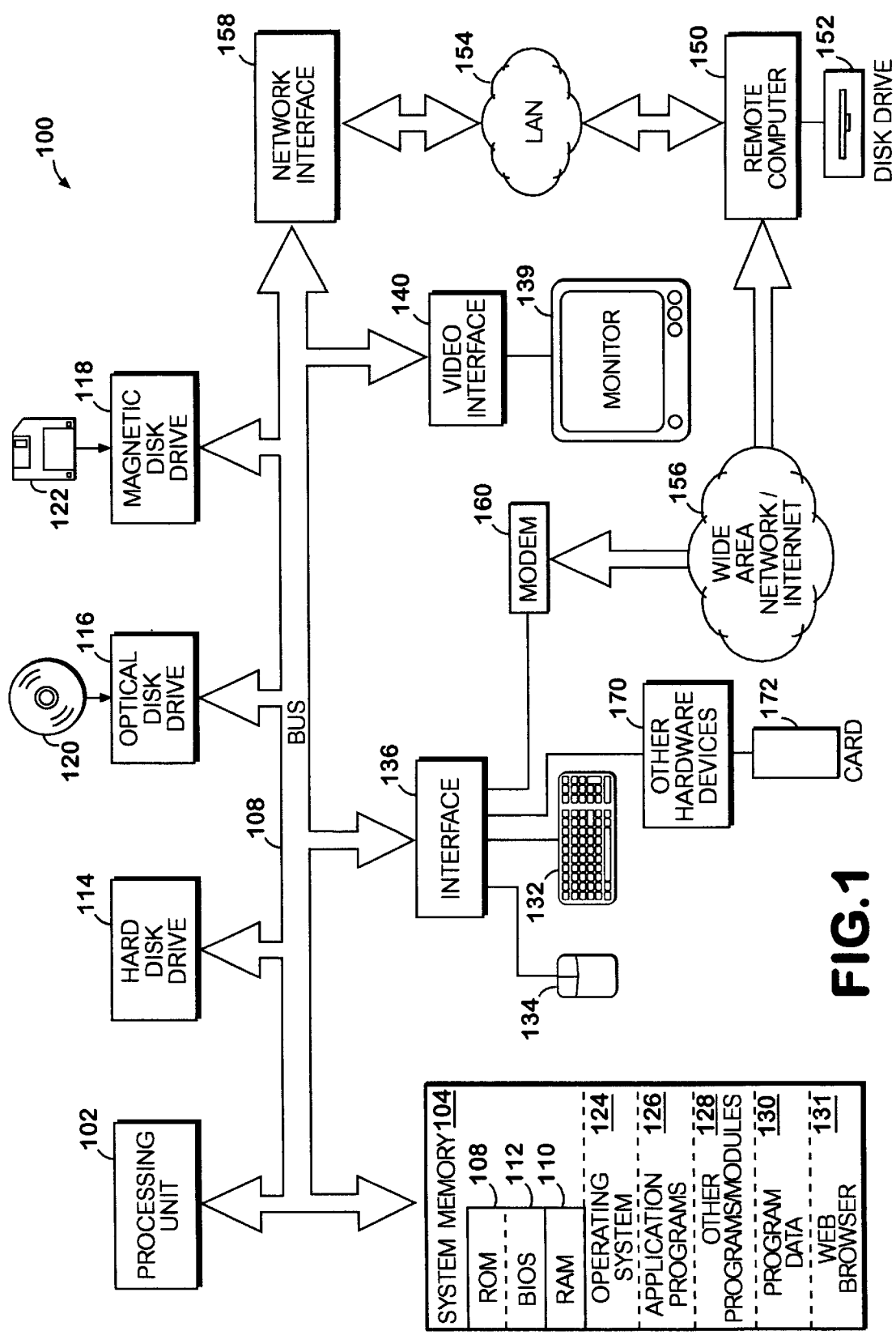
FIG. 1 is a high-level block diagram of a general-purpose computer system upon which the facility preferably executes.

As explained more fully below, embodiments of the invention allow a user to create a diagram of a real-world model, such as a model of a computer network, where the model is stored in a database or otherwise provided to a diagramming facility. The facility provides intelligent context sensitive operations on objects or shapes already in a diagram to incorporate other related elements of the model in an automated fashion. The user's burden of collecting and validating data for the model is eliminated. Furthermore, the user is relieved of actually having to build the diagram wholesale. Instead, under one embodiment, the diagramming facility automatically controls the construction of the diagram based on specific, but minimal, guidance from the user.

The user is responsible for only picking and choosing what the user wishes to see in the diagram. In a broad sense, the diagramming facility allows simple diagramming of a system. A system, such as a network, is typically comprised of nodes or components. During interrogation of the system, a logical model is created, which is comprised of various connected elements that represent the system's components and their interconnections. The software facility then employs the model to create a diagram of shapes representing each element the user wishes to represent in the diagram.

The diagramming facility uses information captured during an automated interrogation of the network, and selectively diagrams portions of the network, complete with connectivity and device-specific interface information. Network devices or components are matched with vendor-specific shapes so that a resulting diagram accurately depicts the physical or hardware devices in the network. Thus, the diagramming facility incorporates the knowledge and intelligence of an existing database that logically represents the real-world model of the network to automate the task of creating diagrams to represent the model. The diagramming facility incorporates the power of the database and allows the user to provide guidance to the facility as to how he or she wishes to view some or all components in the network. The user can easily select components or data he or she finds relevant, while the software facility automatically retrieves appropriate representations of the data (shapes) and displays such shapes in the diagram with the appropriate connections. The burden of gathering and/or validating data in the diagram is avoided.

A diagramming facility, and in particular, an apparatus and related method for diagramming systems such as systems of computer networks represented as logical models, is described in detail herein. In the following description, numerous specific details are provided, such as specific network data, display screens, etc., to provide a thorough understanding of embodiments of the invention. One skilled in the relevant art, however, will recognize that the invention can be practiced without one or more of these specific details, or with other data, screens, etc. In other instances, well known structures or operations are not shown, or not described in detail, to avoid obscuring aspects of the invention.

FIG. 1 and the following discussion provide a brief, general description of a suitable computing environment in which the invention can be implemented. Although not required, embodiments of the invention will be described in the general context of computer-executable instructions, such as program modules being executed by a personal computer. Those skilled in the relevant art will appreciate that the invention can be practiced with other computer system configurations, including hand-held devices, multi-processor systems, microprocessor-based or programmable consumer electronics, network PCs, mini computers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 1, a conventional personal computer 100 includes a processing unit 102, a system memory 104 and a system bug 106 that couples various system components including the system memory to the processing unit. The processing unit 102 may be any logic processing unit, such as one or more central processing units (CPUs), digital signal processors (DSPs), application-specific integrated circuits (ASIC), etc. Unless described otherwise, the construction and operation of the various blocks shown in FIG. 1 are of conventional design. As a result, such blocks need not be described in further detail herein, as they will be readily understood by those skilled in the relevant art.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the personal computer 100, such as during startup.

The personal computer 100 also includes a hard disk drive 114 for reading from and writing to a hard disk (not shown), and an optical disk drive 116 and a magnetic disk drive 118 for reading from and writing to removable optical disks 120 and magnetic disks 122, respectively. The optical disk 120 can be a CD-ROM, while the magnetic disk 122 can be a magnetic floppy disk. The hard disk drive 114, optical disk drive 116 and magnetic disk drive 118 communicate with the processing unit 102 via the bus 106. The hard disk drive 114, optical disk drive 116 and magnetic disk drive 118 may include interfaces or controllers (not shown) coupled between such drives and the bus 106, as is known by those skilled in the art. The drives 114, 116 and 118, and their associated computer-readable media, provide nonvolatile storage of computer readable instructions, data structures, program modules and other data for the personal computer 100. Although the depicted personal computer 100 employs a hard disk, optical disk 120 and magnetic disk 122, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 124, one or more application programs 126, other programs or modules 128 and program data 130. The system memory 104 may also include a web browser 131 for permitting the personal computer 100 to access and exchange data with web sites in the World Wide Web of the Internet, as described below. The application programs 126 include diagramming facilities or applications as described below. More information on diagramming software applications can be found, for example, in U.S. Pat. No. 09/133,975, filed Aug. 14, 1998, entitled "Method and System for Custom Line Patterns," assigned to Visio Corporation, and *Using Visio Enterprise*, User Manual, 1998, by Visio Corporation. While shown in FIG. 1 as being stored in the system memory 104, the operating system 124, application programs 126, other modules 128, program data 130 and web browser 138 can be stored on the hard disk of the hard disk drive 114, the optical disk 120 of the optical disk drive 116 and/or the magnetic disk 122 of the magnetic disk drive 118.

A user can enter commands and information into the personal computer 100 through input devices such as a keyboard 132 and a pointing device such as a mouse 134. Other input devices (not shown) can include a microphone, joystick, game pad, scanner, etc. These and other input devices are connected to the processing unit 102 through an interface 136 such as a serial port interface that couples to the bus 106, although other interfaces such as a parallel port, game port or universal serial bus ("USB") can be used. For example, other hardware devices 170, such as a PCMCIA reader that receives a card 172, can be coupled to the interface 136. A monitor 138 or other display device is coupled to the bus 106 via a video interface 140, such as a video adapter. The personal computer 100 can include other output devices, such as speakers, printers, etc.

The personal computer 100 can operate in a networked environment using logical connections to one or more remote computers, such as a remote computer 150. The remote computer 150 can be another personal computer, a server, a router, a network PC, a peer device or other common network node, and typically includes many or all of the elements described above for the personal computer 100. Typically, the remote computer 150 includes a memory storage device such as a disk drive 152 shown in FIG. 1. The remote computer 150 is logically connected to the personal computer 100 under any known method of permitting computers to communicate, such as through a local area network ("LAN") 154 or a wide area network ("WAN") or Internet 156. Such networking environments are well known in offices, enterprise-wide computer networks, intranets and the Internet.

In a LAN networking environment, the personal computer 100 is connected to the LAN 154 through an adapter or network interface 158 (coupled to the bus 106). When used in a WAN networking environment, the personal computer 100 often includes a modem 160 or other device for establishing communications over the WAN/Internet 156. The modem 160 is shown in FIG. 1 as coupled between the interface 136 and the WAN/Internet 156. In a networked environment, program modules, application programs, or data, or portions thereof, can be stored in the remote computer 150, such as in the disk drive 152. Those skilled in the relevant art will readily recognize that the network connections shown in FIG. 1 are only some examples of establishing communication links between computers, and other links may be used, including wireless links.

Figure 2:
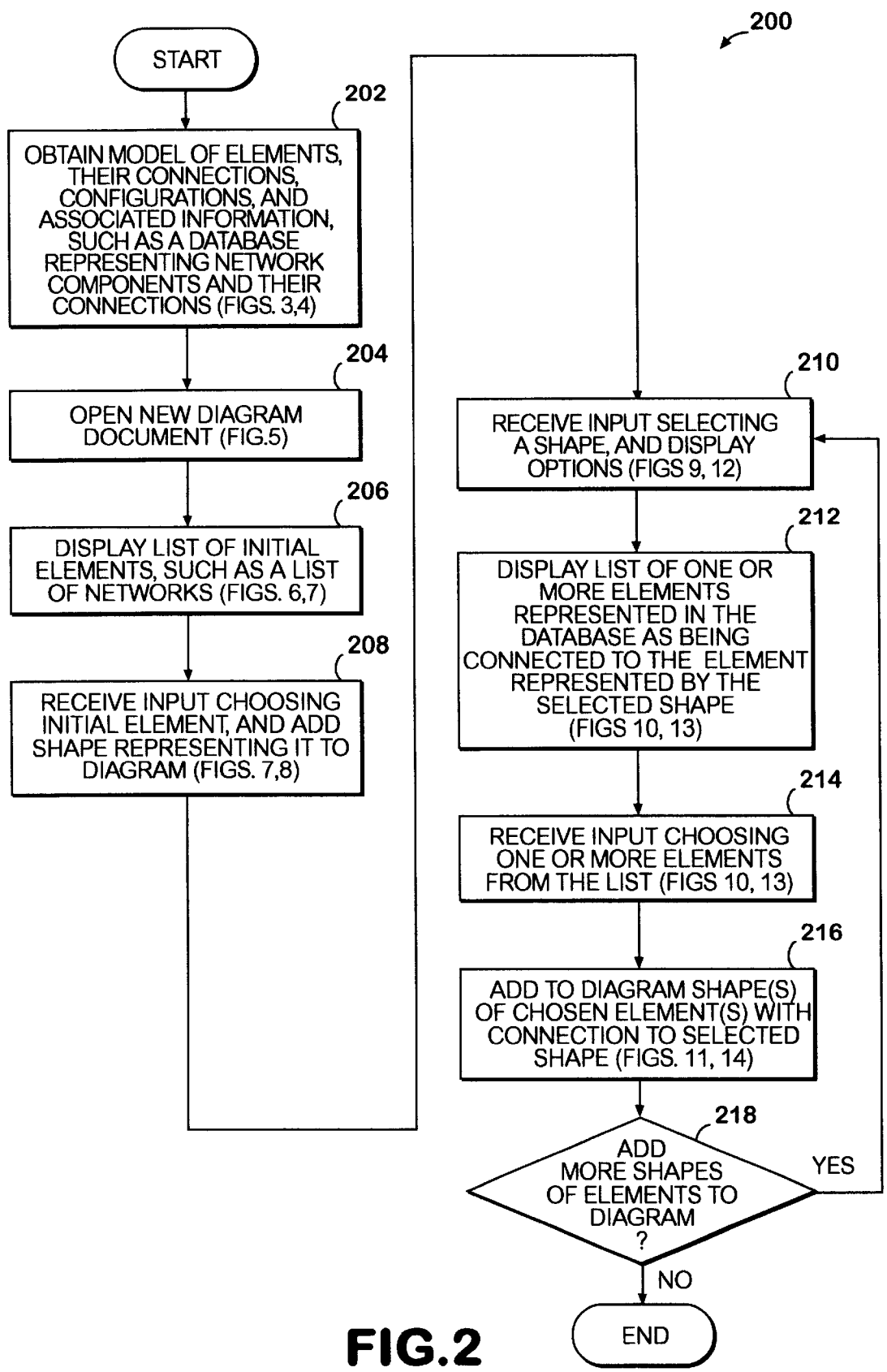
FIG. 2 is a flowchart depicting a facility for diagramming a model of, e.g., a computer network, under an embodiment of the invention.

Referring to the flowchart of FIG. 2, a routine or facility 200 performed by all or part of the personal computer 100 receives data from a database of logical network configurations and produces a diagram of a network. Unless described otherwise herein, the steps depicted in FIG. 2 are well known, or those skilled in the relevant art can create source code (such as in Visual Basic), microcode or program logic arrays or firmware for such steps, based on the detailed description provided herein. All or part of the facility 200 can be stored in the system memory 104 and/or non-volatile memory such as the magnetic disk 122.

Beginning in step 202, the facility 200 obtains a model of logically connected elements such as a database of network components, their connections, configurations and associated information. In one embodiment, the facility 200 obtains a database produced under an automated network interrogation facility. One example of such an interrogation facility is AutoDiscovery technology by Visio Corporation of Seattle, Wash. The AutoDiscovery technology, without network interruption, begins at a single router in a network and builds a comprehensive database of the network including both device and connectivity information, at both LAN and enterprise levels. More details on the AutoDiscovery technology can be found, for example, in *Modeling in Visio Enterpise*, User Manual, 1998, by Visio Corporation.

Figure 3:
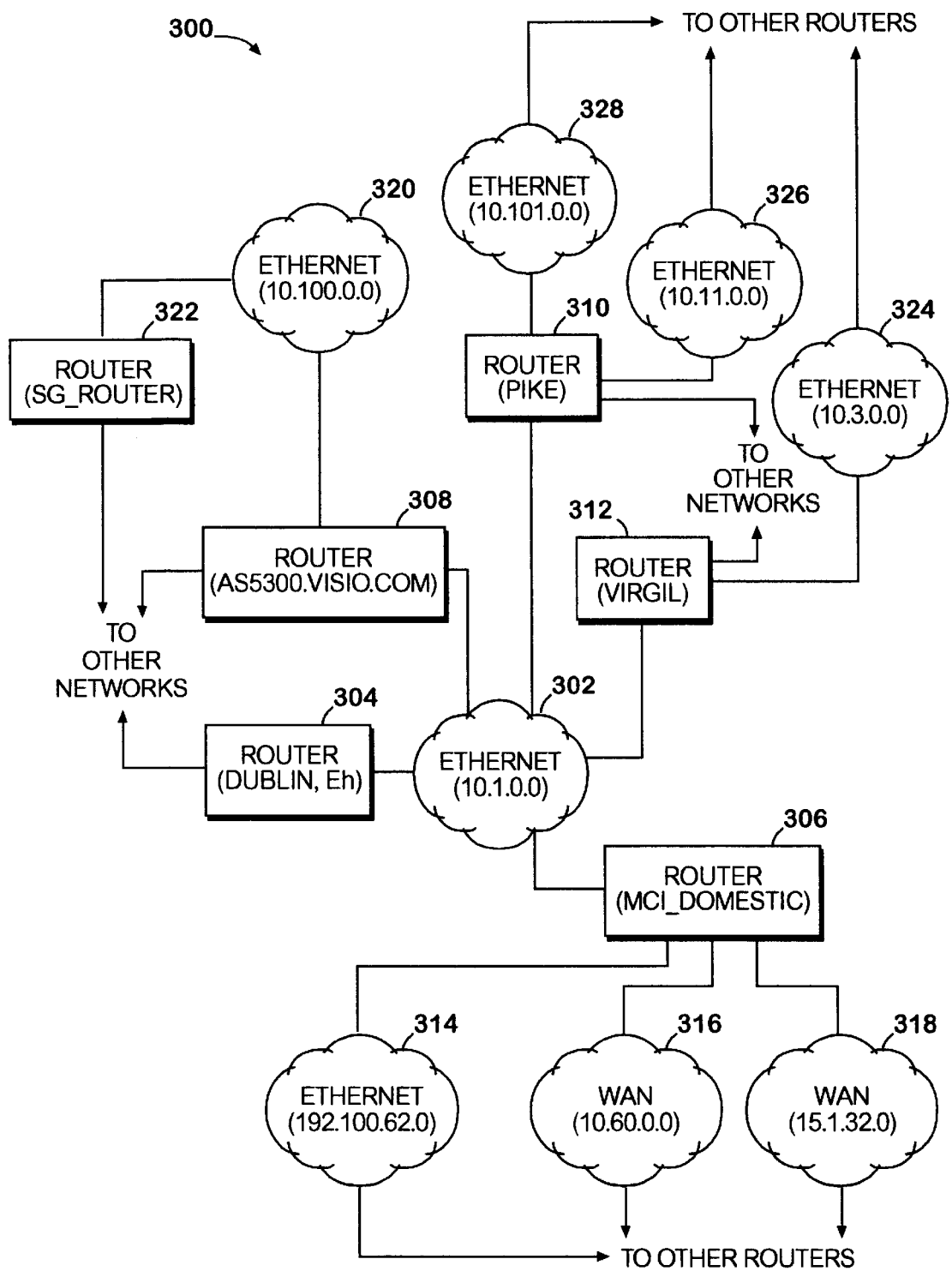
FIG. 3 is a block diagram of a computer network.

Referring to FIG. 3, a block diagram shows a portion of typical network system 300. The system network 300 in FIG. 3 shows only OSI (Open Systems Interconnection) layer-3 level devices; not shown are switches and other network elements. The system network 300 includes an Ethernet network 302 (address 10.1.0.0), which in turn is coupled to five routers 304, 306, 308, 310 and 312. The router 306 in turn is coupled to three other networks: an Ethernet network 314 (address 192.100.62.0), a WAN 316 (address 10.60.0.0) and a WAN 318 (address 15.1.32.0). The networks 314 through 318 in turn are coupled to other routers (not shown). The router 308 as shown in FIG. 3 is coupled to an Ethernet network 320 (address 10.100.0.0), which in turn is coupled to a router 322. The router 312 is coupled to an Ethernet network 324 (address 10.3.0.0), while the router 310 is coupled to two Ethernet networks 326 and 328 (addresses 10.11.0.0 and 10.101.0.0, respectively). The routers 304, 308, 310, 312 and 322 can be connected to other networks (not shown). Those skilled in the art can appreciate that FIG. 3 shows only a portion of the network 300; a figure showing the whole network would be extremely complex, detailed and often unmanageable for most uses. As explained below, the facility 200 automatically generates a diagram of only a portion of the network 300, which may be more useful to a user.

Figure 4A:
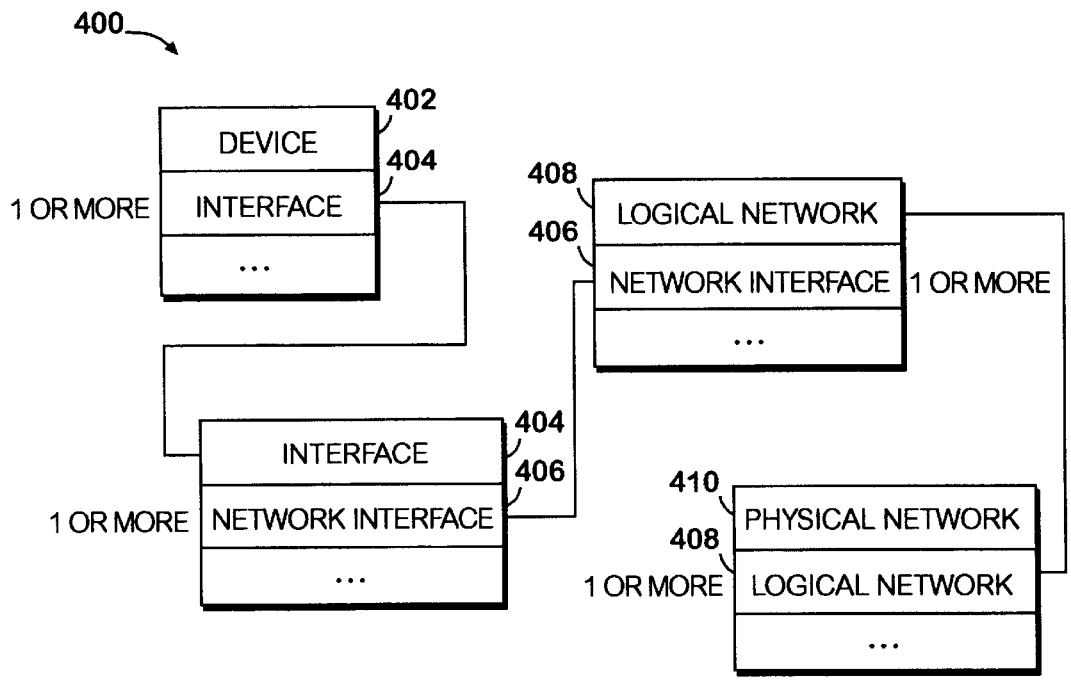
FIG. 4A is a schematic data structure diagram logically representing network devices, interfaces, and other network elements and connections therebetween.

FIG. 4A shows a schematic or logical representation of various components in a network and their interconnections. As shown in FIG. 4A, a data structure or model 400 includes a device element 402 that logically represents a component in the network such as a router. The router includes one or more interface cards ("interfaces"), which are logically represented in the model 400 including an (e.g. interface 404). Each of these interfaces includes one or more network interfaces, such as a network interface 406 of the interface 404. Each network interface in turn is connected to one logical network, and thus the network interface 406 is connected to a logical network 408. The logical network 408 can include other network interfaces. Ultimately, the network 300 (as shown in FIG. 3), represented logically as a physical network 410, includes one or more logical networks, such as the logical network 408.

Using known network interrogation technology, such as Visio's AutoDiscovery technology, a database is created that logically represents the network system of components as a model comprised of various interconnected elements. The database may be stored, for example, in the hard disk drive 114, or the disk drive 152, shown in FIG. 1. The computers that may run the facility 200 need not necessarily be connected to the network to be diagrammed. Thus, while the computer 100 is shown in FIG. 1 as being connected to the LAN 154, which could be diagrammed under the facility 200, the example described below applies to the network 300, which is independent of the computer system 100.

Figure 4B:
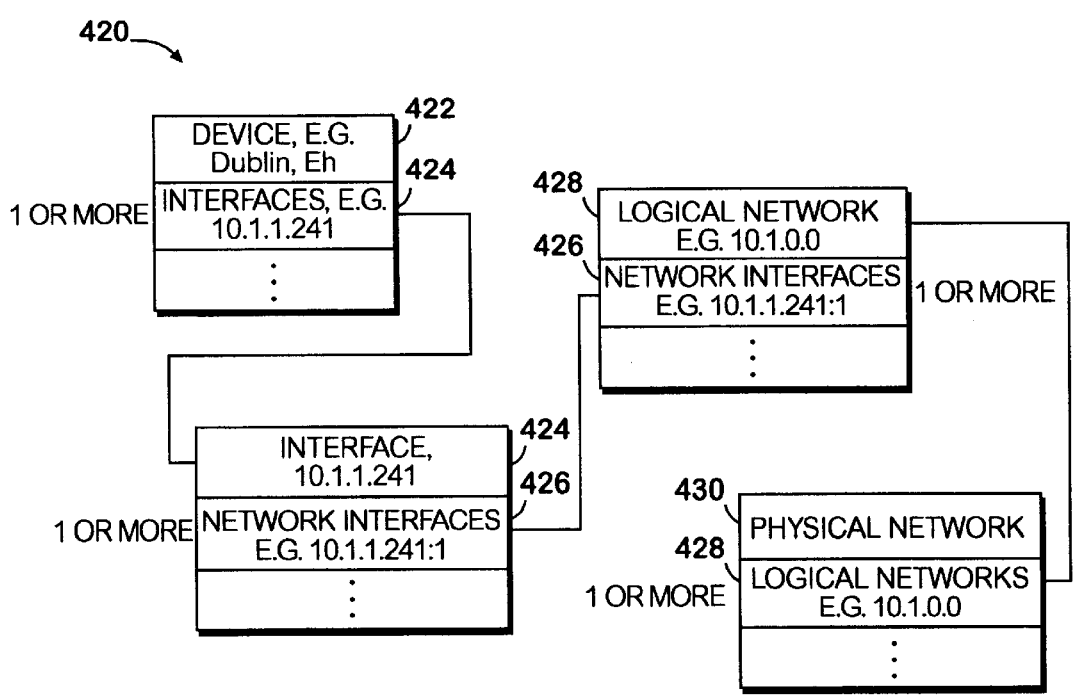
FIG. 4B is a schematic diagram of the data structure of FIG. 4A with logical representations for the computer network of FIG. 3.

Referring to FIG. 4B, a logical representation of a portion of the network 300 is shown. As shown in FIG. 4B, a model 420 illustrates the logical relationships between the router 304 ("Dublin, Eh") and the Ethernet network 302 ("10.1.0.0") in the network system 300, together with their logical addresses. Thus, the router 304 is represented in the model 420 as a device label or address 422 ("Dublin, Eh"), with one or more logically associated interfaces, such as interface 424 ("10.1.1.241"). The interface 424 in turn is logically related to one or more network interfaces in the database, such as the network interface 426 ("10.1.1.241:1"). The network interface 426 in turn is logically related in the database to one logical network, i.e., a logical network 428 ("10.1.0.0"). An overall physical network 430 includes one or more logical networks (e.g. the logical network 428).

As explained below, the facility presents to the user all of the networks shown in FIG. 3 that form part of the overall network 300, including the logically represented logical network 428, as well as logically connected components or devices, such as the router 304 (represented logically as the device 422). The user then selects one or more of these networks (and their associated logical network labels), and the facility 200 places shapes of such networks in a diagram, with appropriate connections to selected components.

The elements of FIG. 4B can be stored in any known configuration in the database. Based on this database, the diagramming facility 200 assists a user in creating a diagram of shapes to represent the various components in the network system 300. Further details on a database of a model can be found, for example, in U.S. Pat. No. 5,495,604, entitled "Method and Apparatus for the Modeling and Query of Database Structures Using Natural Language-Like Constructs," issued Feb. 27, 1996, and assigned to Visio Corporation.

Figure 5:
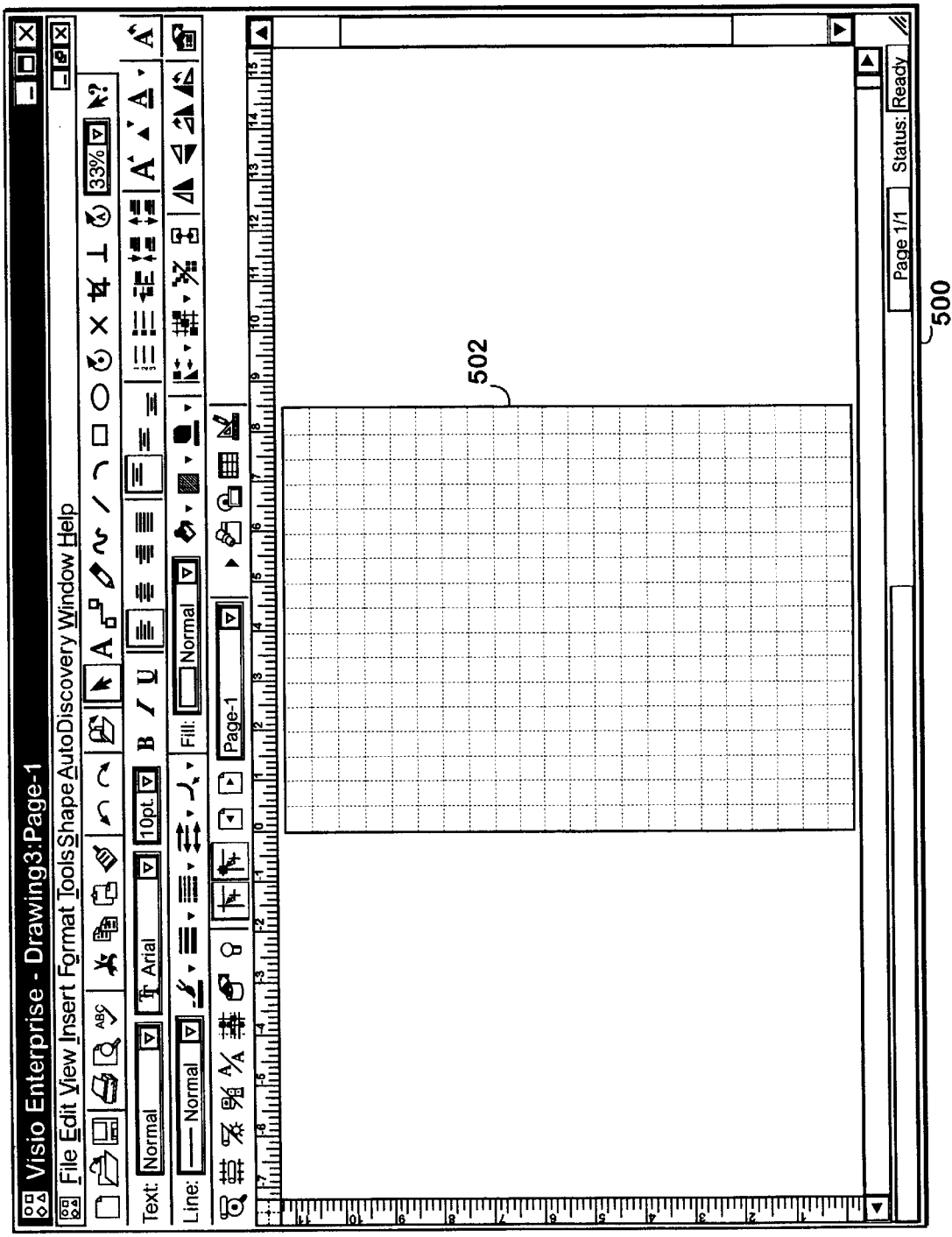
FIG. 5 is an initial display screen showing an open diagram document

A user begins creating a diagram of a portion of the network system 300 by identifying an initial component or point for the diagram. In step 204, the facility 200 opens a new diagram document under one of various known methods of opening documents. Referring to FIG. 5, a window 500 includes an open diagram document 502. The diagram 502 can be opened by, for example, executing a "open" command under the drop-down file menu common in Microsoft Windows compatible applications.

Figure 6:
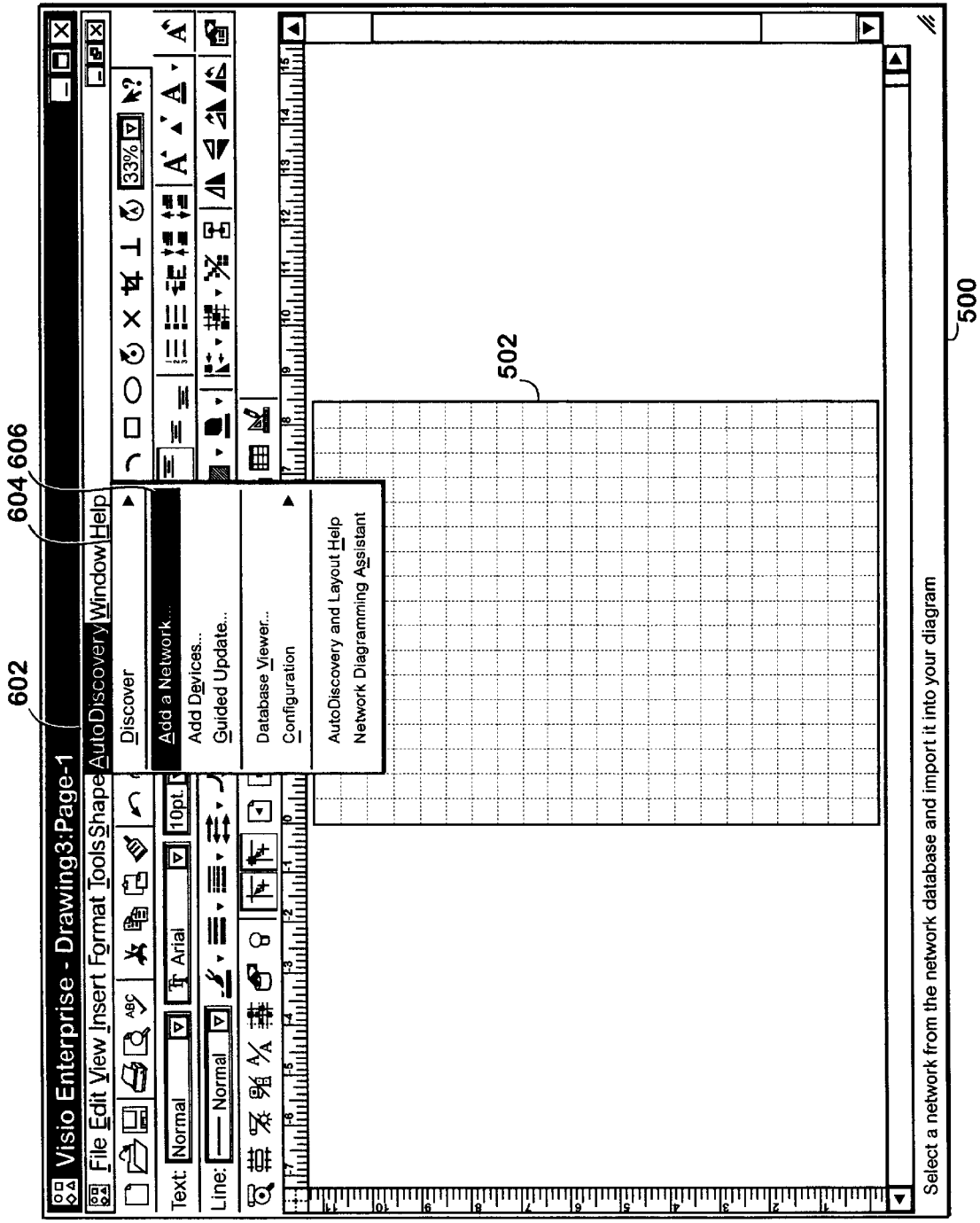
FIG. 6 is a display screen showing a pull-down menu for adding a network shape to the open diagram.
Figure 7:
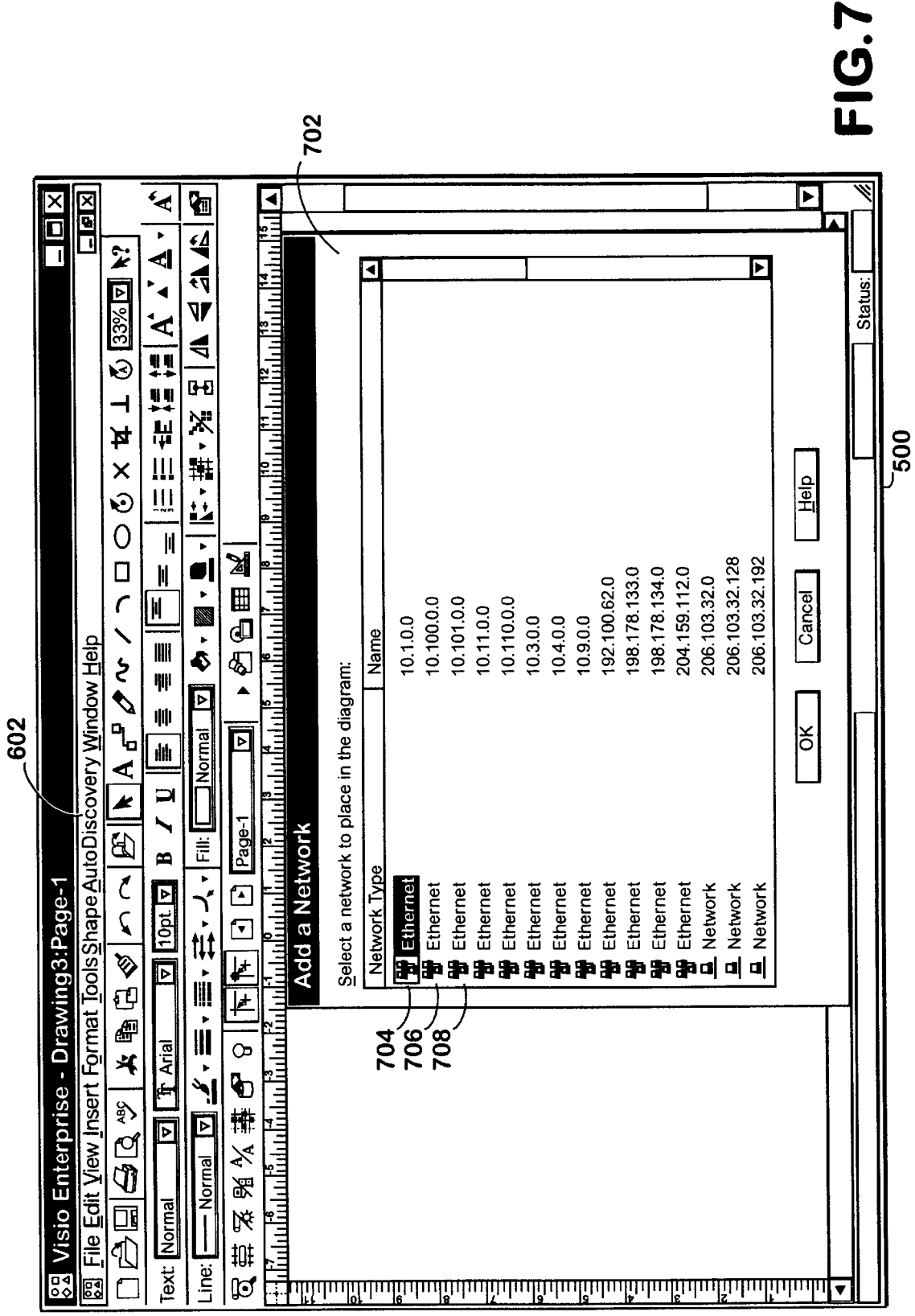
FIG. 7 is a display screen showing a dialog box listing networks that can be represented in the open diagram of FIG. 5.

In step 206, the facility 200 displays a list of initial elements, such as a list of networks, which will form a starting point for the diagram the user creates. Referring to FIG. 6, the user executes an "AutoDiscovery" command in a menu bar to display a drop-down menu 604 that lists AutoDiscovery options, including an "Add a Network . . . " command 606. Selecting the Add a Network command 606 causes the facility 200 to display a dialog box 702 as shown in FIG. 7. The dialog box 702 displays a list of networks (e.g., Ethernet, network, etc.) and a corresponding name or address for the network. As shown in FIG. 7, three Ethernet networks 704, 706 and 708 are shown, with corresponding addresses 10.1.0.0, 10.100.0.0 and 10.101.0.0, (i.e. networks 302, 320 and 328 of FIG. 3, all respectively). Under step 206, the facility 200 queries the database to identify and return records of all logical networks (and associated addresses), including the logical network 428 shown in FIG. 4B.

In step 208, the facility 200 receives input from the user choosing an initial element or network from the dialog box 702. The user, for example, uses the mouse 134 to move a pointer (not shown) to the Ethernet network 704 and right button clicks on this network, using known computer input techniques. Other methods of selecting a desired network from the dialog box 702 are possible. Indeed, those skilled in the relevant art will recognize that the facility 200 can receive user input using any known methods.

Figure 8:
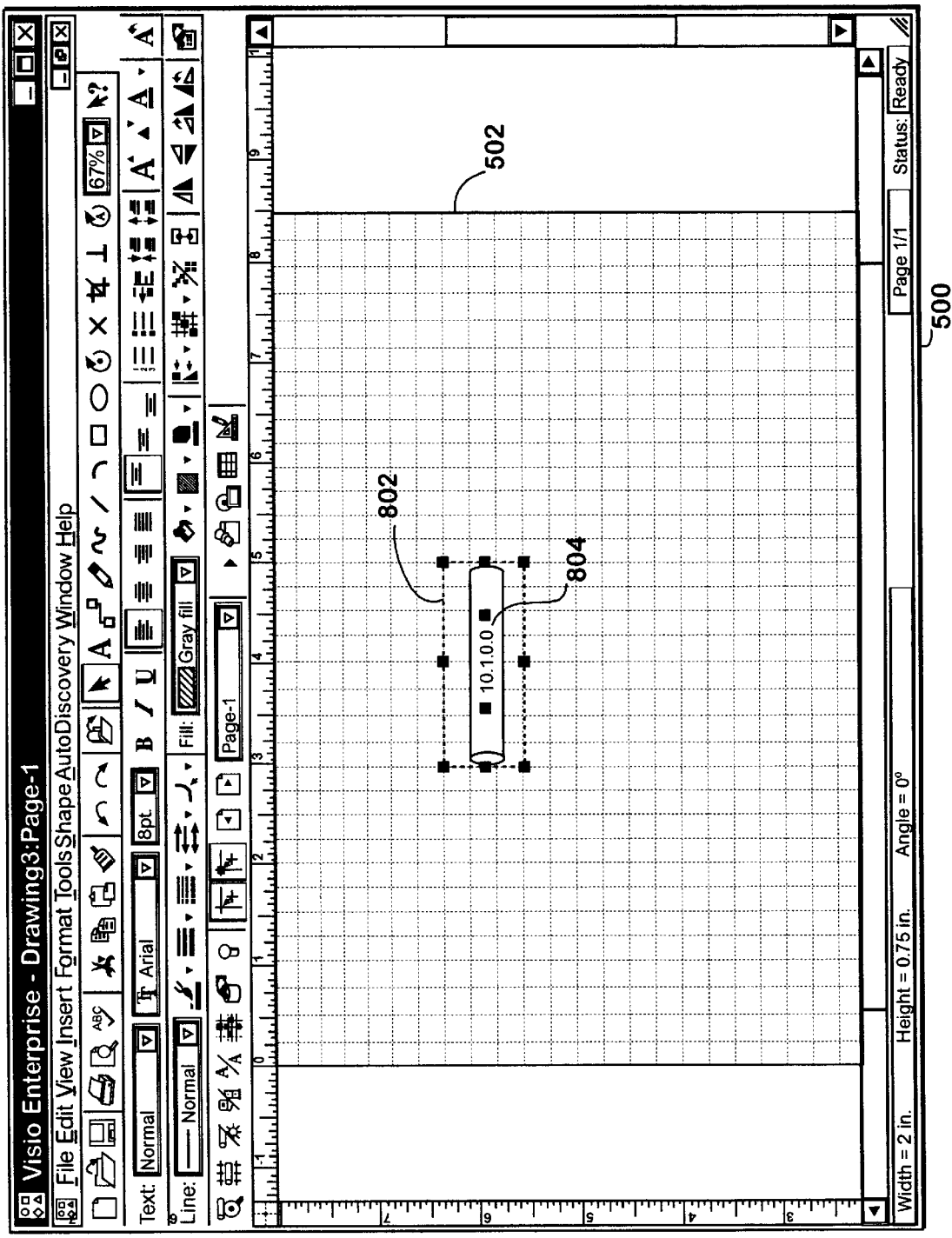
FIG. 8 is a display screen showing a network shape selected from the dialog box of FIG. 7.

Referring to FIG. 8, after selecting the Ethernet network 704, the facility 200 in step 208 adds a network shape 802, to the diagram 502, which represents the Ethernet network 702. The network shape 802 includes a name or label 804 representing the corresponding address for the Ethernet network 704 (i.e., "10.1.0.0").

Figure 9:
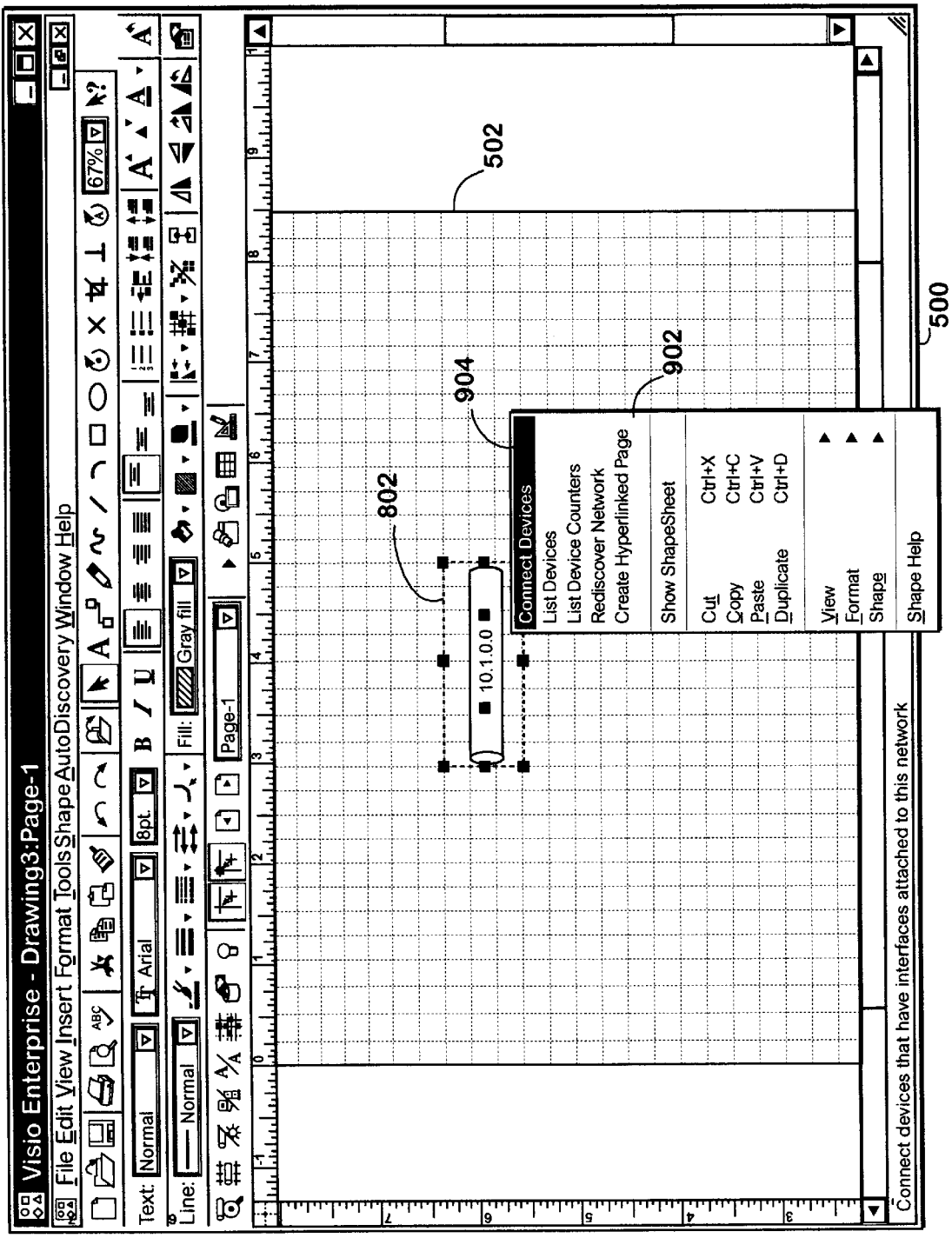
FIG. 9 is a display screen showing a drop-down menu of options associated with the network shape of FIG. 8.

In step 210, the facility 200 receives input selecting a shape, and displays options with respect to that shape. To select a shape in the diagram 502, the user can, or example, actuate the right mouse button ("right-click") on the network shape 802. In response thereto, the facility 200 displays a drop-down menu 902 that lists options or commands with respect to the network shape 802, including a "connect devices" command 904, as shown in FIG. 9. The drop-down menu 902 presents operations that allow the user to expand the diagram 502 in a logical fashion by showing only operations related to the selected shape (e.g., the shape 802). Furthermore, the facility 200 presents only data relevant to the user for creating the diagram 502, such as displaying only those components logically connected to the selected component, and filtering all other data in the database. The facility 200 expands the diagram 502 automatically by acting only on the operations specified by or elements selected by the user from the filtered data to layout new shapes in the diagram in a logical manner.

Figure 10:
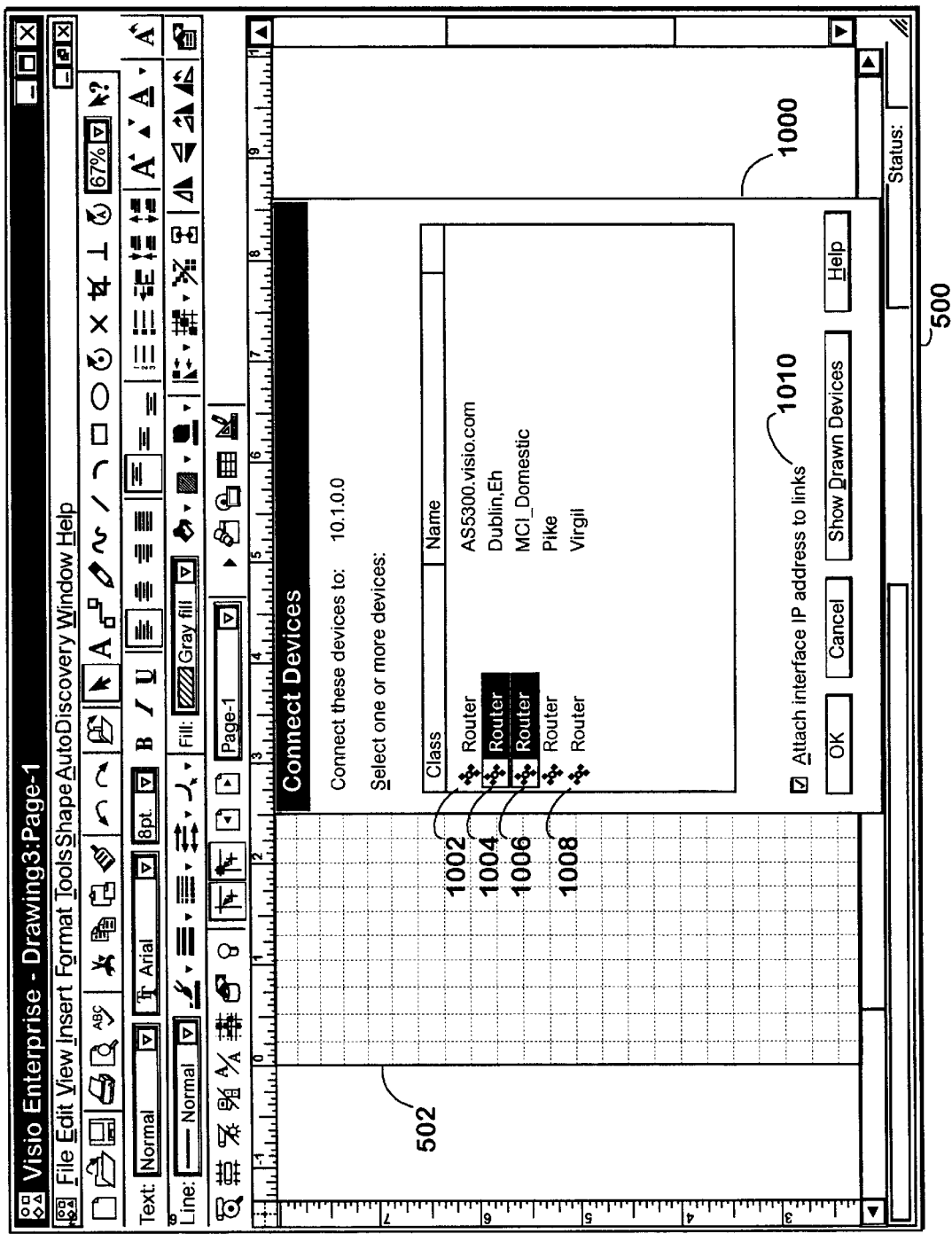
FIG. 10 is a display screen showing a dialog box listing devices logically connected to the network of FIG. 8.

By selecting the Connect Devices command 904, the facility 200 in step 212 displays a list of one or more elements represented in the database as being logically connected to the element represented by the selected shape in the diagram. As shown in FIG. 10, the facility 200 in step 212 displays a dialog box 1000 listing devices logically connected to the network 302, including routers 1002 through 1008 (i.e. routers 304–312 in FIG. 3). Each device or class of devices is shown in the dialog box 1000 with corresponding names or addresses. A selection 1010 in the dialog box 1000 allows the user to determine whether interface IP ("Internet Protocol") addresses are attached to links between devices selected in the dialog box and the shape previously selected in the diagram 502. In step 214, the facility 200 receives input choosing one or more elements from the list. The user, using known techniques, selects one or more devices in the dialog box 1000, such as routers 1004 and 1006, having addresses Dublin, Eh, and $MCI_{13}$ Domestic, respectively.

Figure 11:
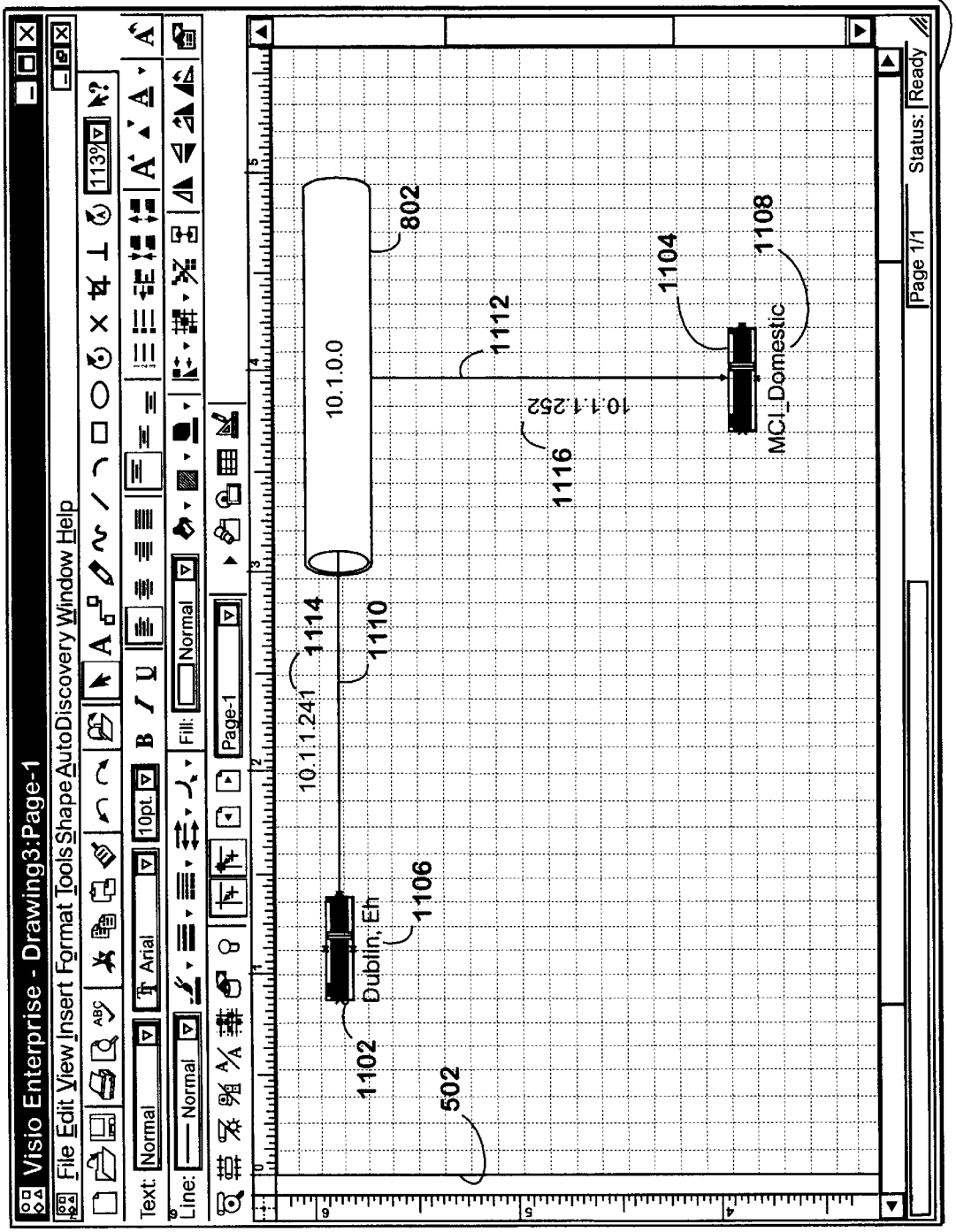
FIG. 11 is a display screen showing shapes of two devices, selected from the dialog box of FIG. 10, connected to the network shape.

In step 216, the facility 200 adds, to the diagram, the shapes of the chosen elements with connections to the previously selected shape. As shown in FIG. 11, router shapes 1102 and 1104 are added to the diagram 502. Labels 1106 and 1108, "Dublin, Eh" and "MCI_Domestic," are likewise added to the diagram 502 to the router shapes 1102 and 1104, all respectively. The router shapes 1102 and 1104 are selected from a database of shapes (not shown), where such shapes represent the physical appearance of the network component (e.g., router).

The facility 200 also automatically connects the added router shapes 1102 and 1104 to the network shape 802 by connections 1110 and 1112, respectively. The connections 1110 and 1112 have corresponding labels or interface IP addresses "10.1.1.241" and "10.1.252" (represented by reference numerals 1114 and 1116), all respectively.

Figure 12:
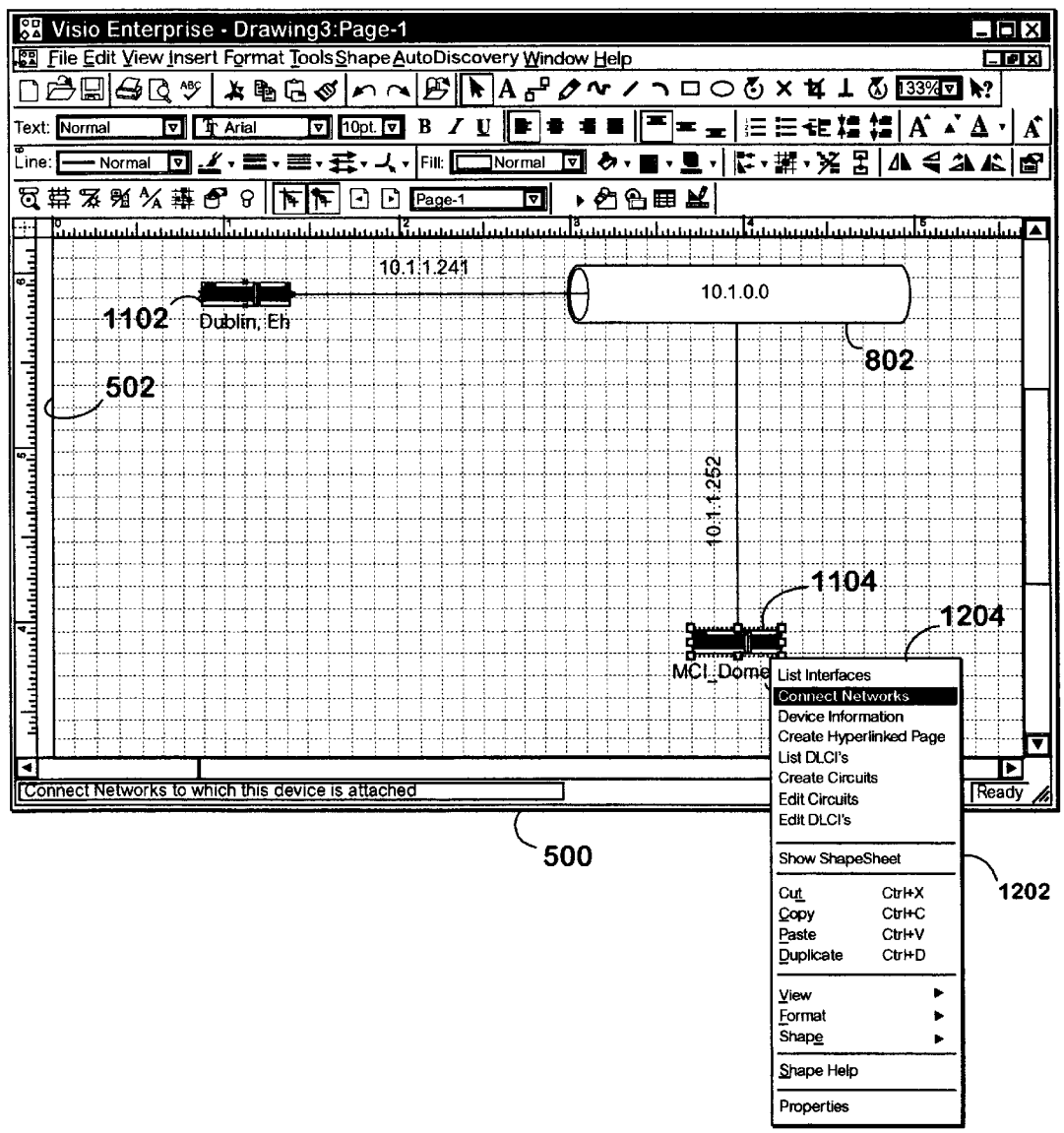
FIG. 12 is a drop-down menu listing options associated with one of the device shapes of FIG. 11.

In step 218, the facility 200 determines whether more shapes of elements are to be added to the diagram. For example, the facility 200 determines whether additional user input is received. If so, then the facility 200 loops back to again perform steps 210–218. As shown in FIG. 12, when the user right-clicks on the router shape 1104, the facility 200 displays a drop-down menu 1202 listing options or commands associated with that router shape, under step 210. The options in the drop-down menu 1202 include a "Connect Networks" command 1204.

Figure 13:
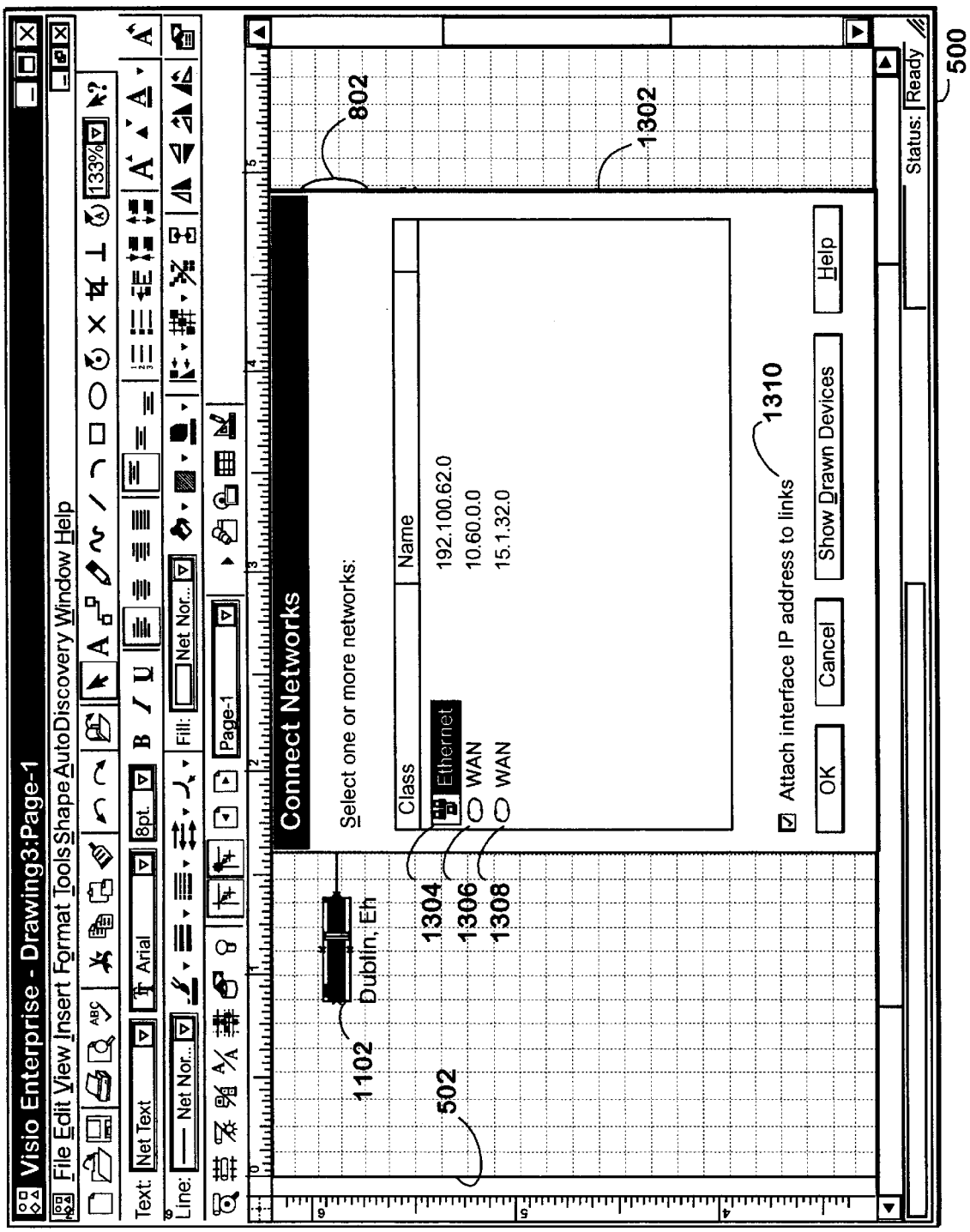
FIG. 13 is a display screen showing a dialog box listing network elements logically connected to the selected device shape of FIG. 12.
Figure 14:
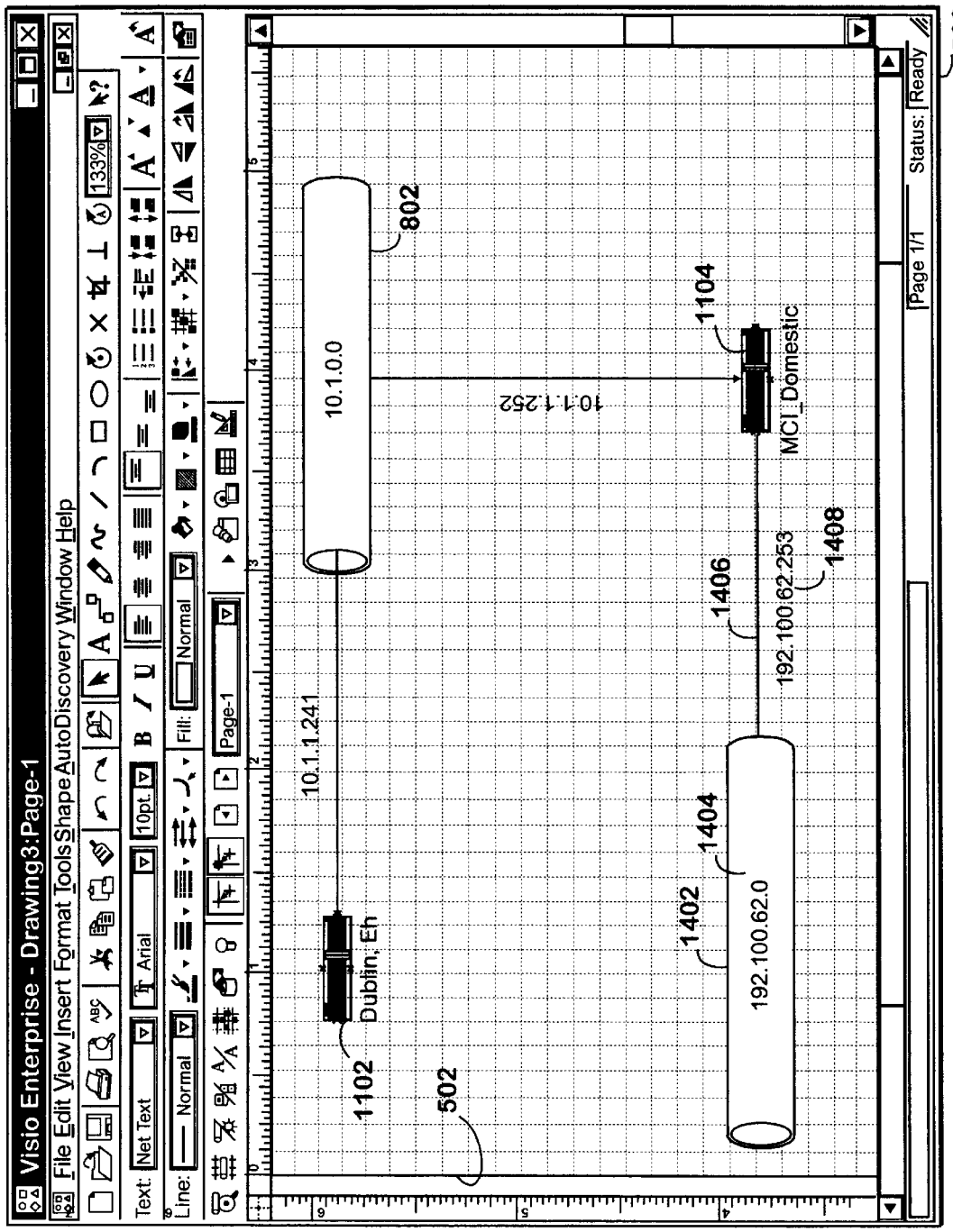
FIG. 14 is a display screen showing a new network shape, selected from the dialog box of FIG. 13, connected to the device shape of FIG. 12.

Referring to FIG. 13, the facility 200 under step 212 displays a dialog box 1302 based on the Connect Networks command 1204. The dialog box 1302 includes a list of components or networks logically connected to the router shape 1104, including an Ethernet network 1304, and WANs 1306 and 1308 (corresponding respectively to networks 314, 316 and 318 of FIG. 3). Again, the facility 200 queries the database to identify and return a list of networks logically connected to the selected router component, and display such elements in the dialog box 1302. As with the dialog box 1000, the dialog 1302 provides a command 1310 that allows the user to determine whether interface IP addresses are attached to links. Under step 214, the facility 200 receives input from the user selecting the Ethernet network 1304 from the dialog box 1302. In response thereto, under step 216, the facility 200 adds a network shape 1402, with corresponding label 1404, to the diagram 502. The facility 200 displays a connection 1406 between the router shape 1104 and the newly added network shape 1402, together with an appropriate label 1408, in a manner similar to that described above.

Referring now to FIGS. 15–20, additional options for displaying network information under the facility 200 will be discussed. The screens shown in FIGS. 15–20 are generated under steps 210–218 under the facility 200 as described above. Thus, only important differences are discussed below.

Figure 15:
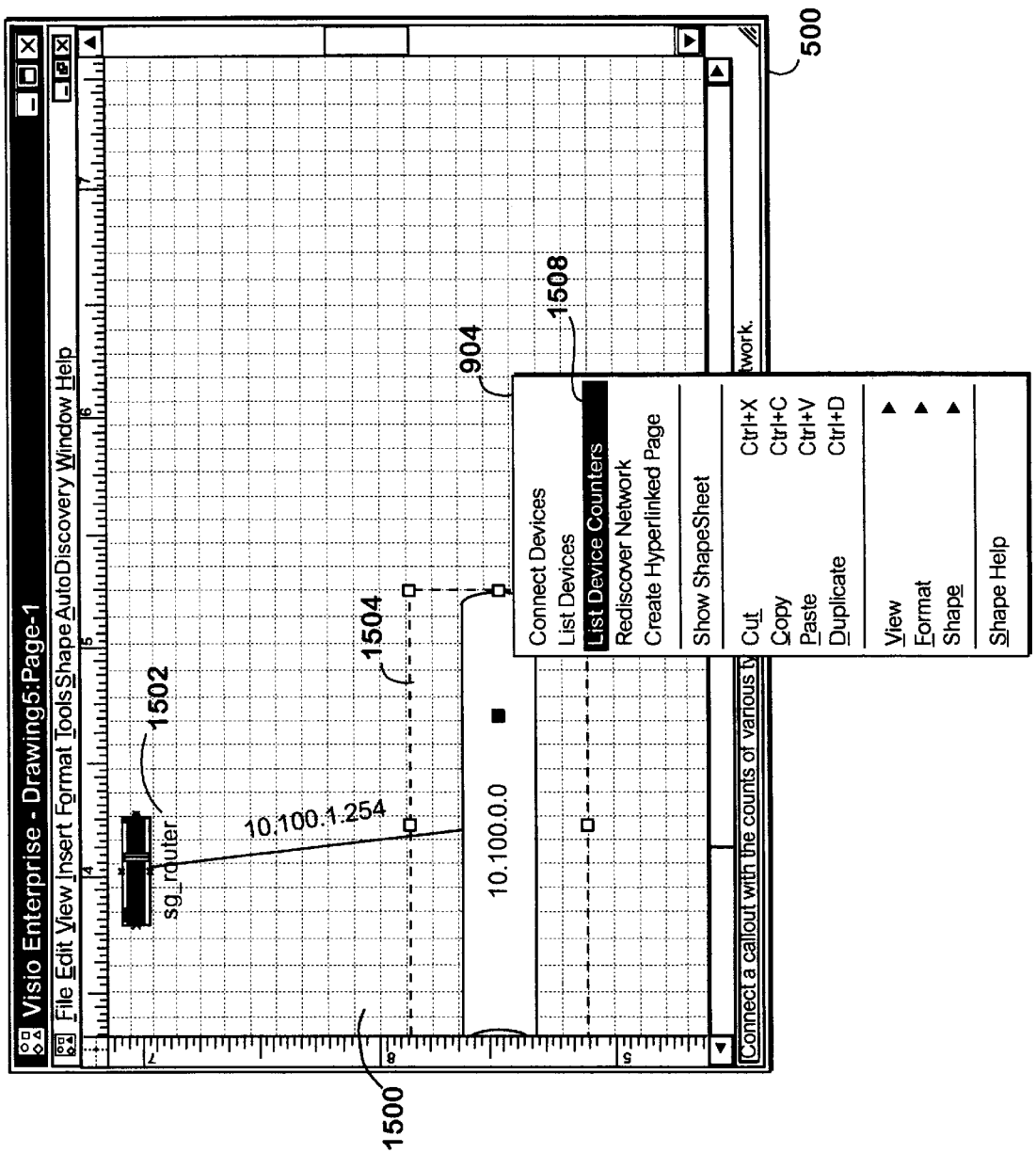
FIG. 15 is a display screen showing a drop-down menu of options associated with a network shape.
Figure 16:
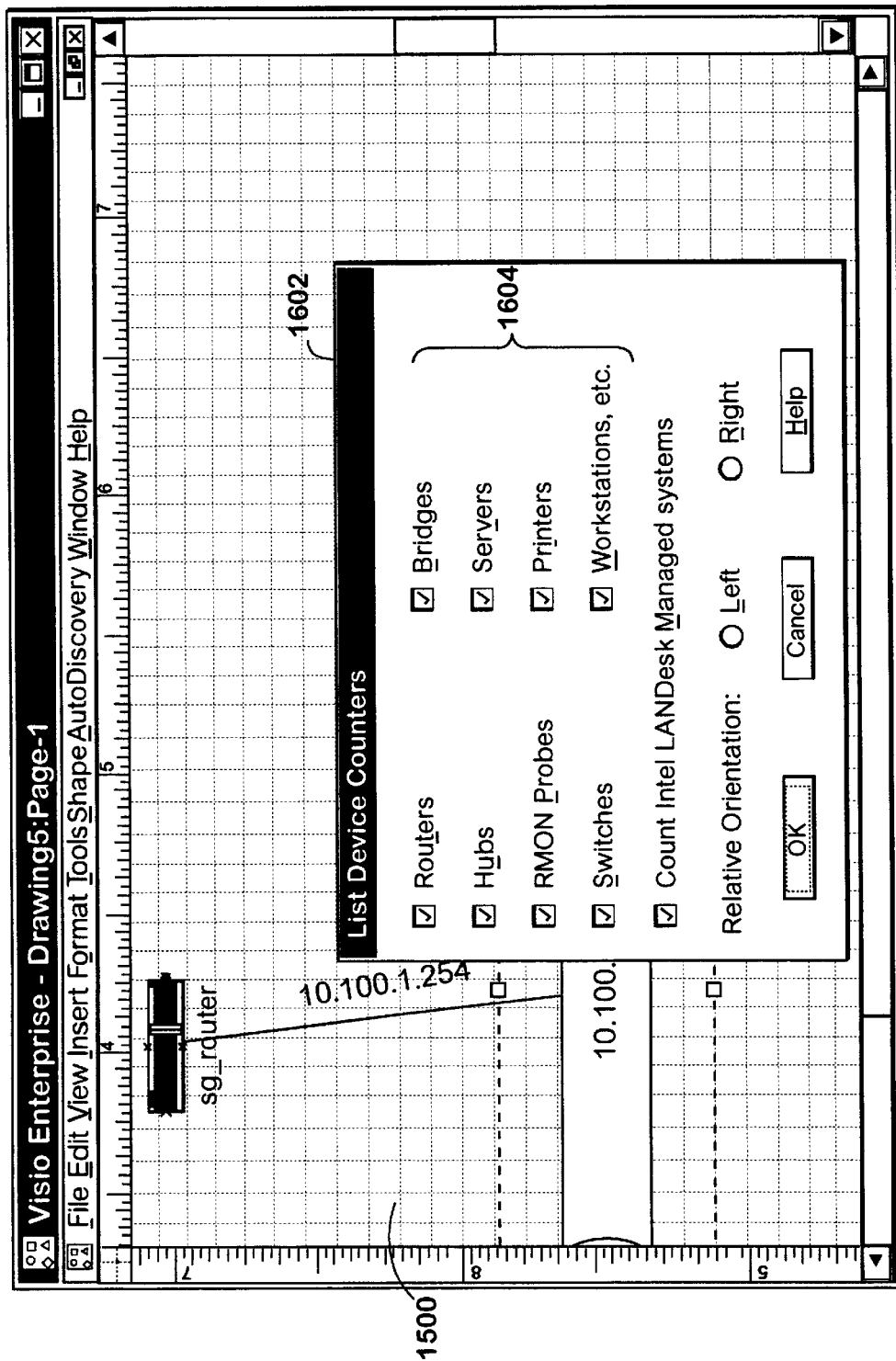
FIG. 16 is a display screen showing a dialog box identifying types of devices that may be selected for generating a listing of such devices as connected to the network shape of FIG. 15.
Figure 17:
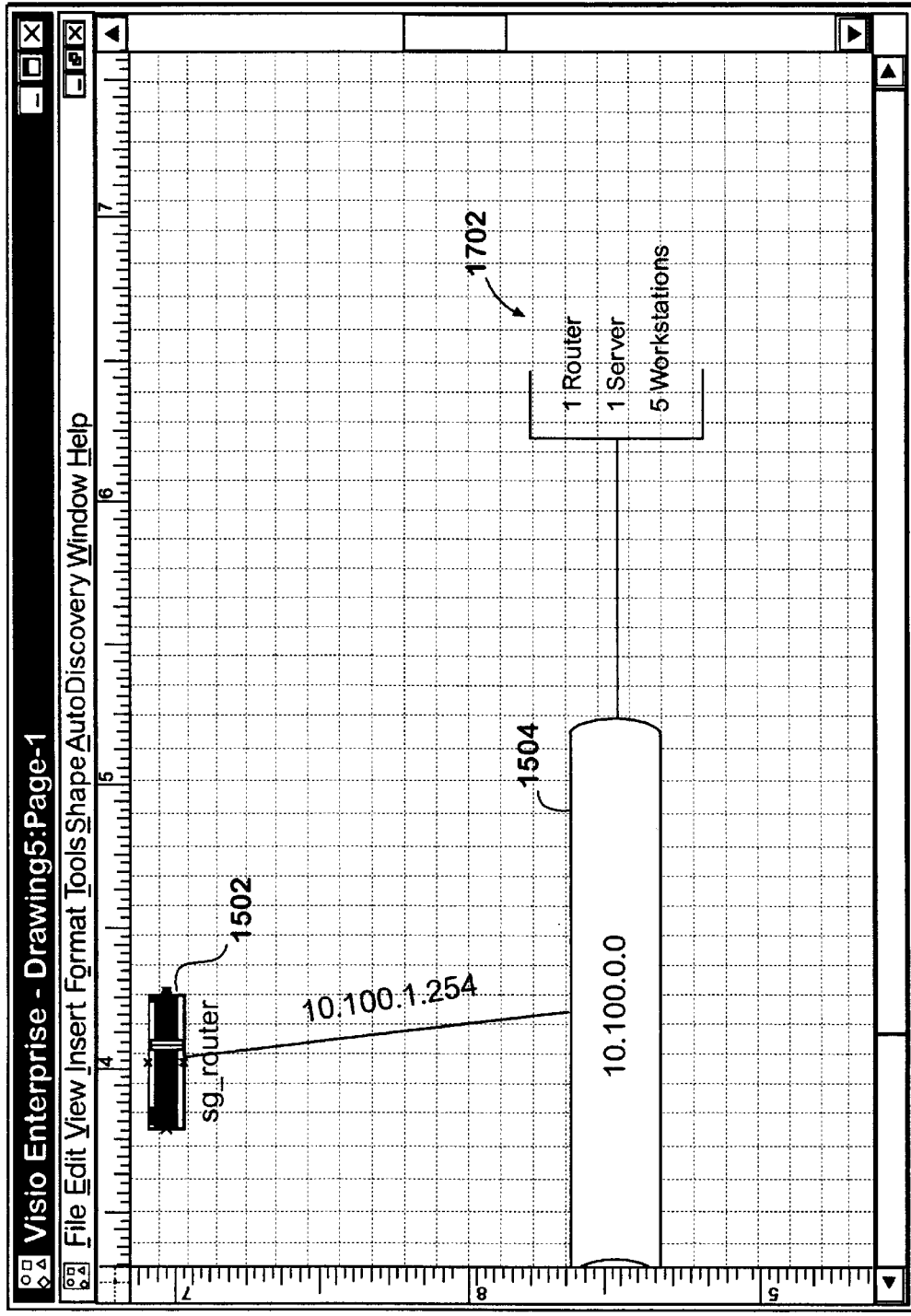
FIG. 17 is a display screen showing a list of devices and corresponding count of such devices, connected to the network shape of FIG. 15.

Referring to FIG. 15, a diagram 1500 includes a router shape 1502 connected to a network shape 1504. The facility 200 under step 210 receives input to display the drop-down menu 904, from which the user selects a "List Device Counters" command 1508. In response thereto, the facility 200 displays a dialog box 1602, as shown in FIG. 16. The dialog box 1602 includes a section 1604 listing devices that can be user selected. The list of devices includes: routers, hubs, remote monitoring specification (RMON) probes, switches, bridges, servers, printers, and workstations. The dialog box 1602 also allows the user to select relative orientation of the displayed information in the diagram 1500 (left or right), and whether to count Intel LANDesk Managed systems. After receiving input from the user in the dialog box 1602 under step 214, the facility 200 in step 216 displays a number of devices selected in the dialog box and a corresponding number of such devices that are connected to the corresponding shape in the diagram. The facility 200 queries the database to determine a number and type of logical connections to the elements selected in the dialog box, groups such devices by type, and then displays such devices in the diagram. For example, as shown in FIG. 17, the network shape 1504 is connected to one router, one server and five workstations, which are depicted in a list 1702 in the diagram 1500.

Figure 18:
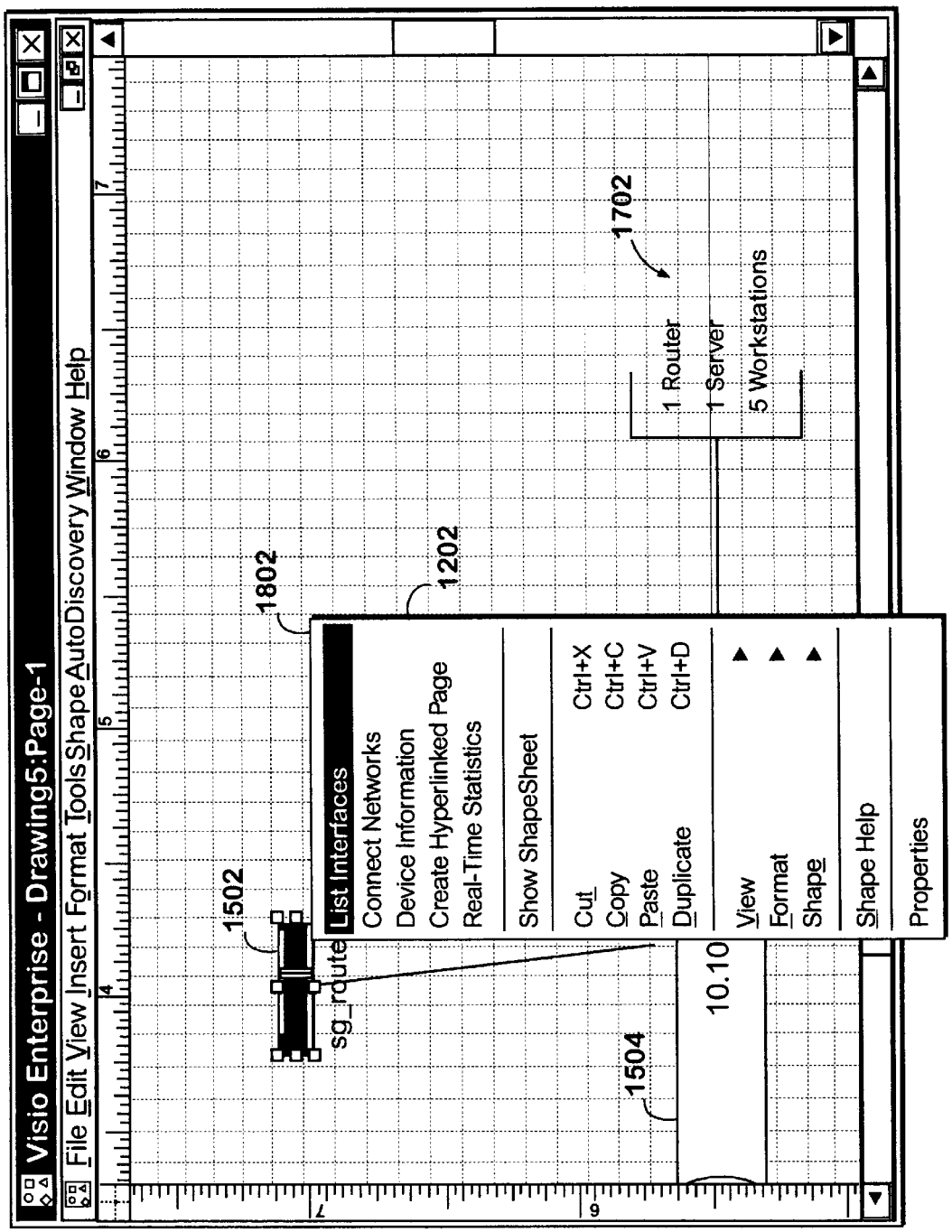
FIG. 18 is a drop-down menu listing options associated with a device shape of FIG. 15.
Figure 19:
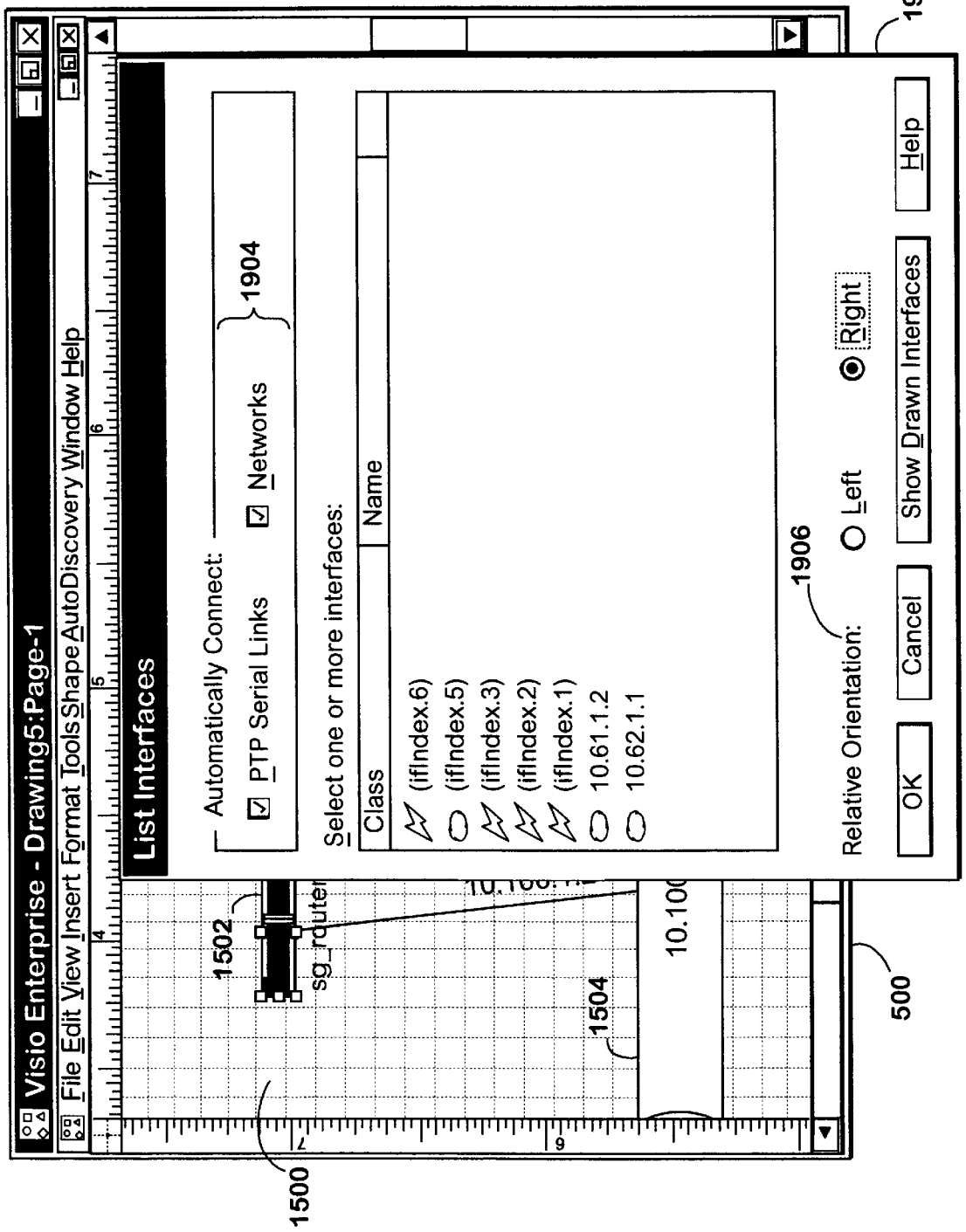
FIG. 19 is a display screen showing a dialog box listing interfaces associated with the shape selected in FIG. 18.
Figure 20:
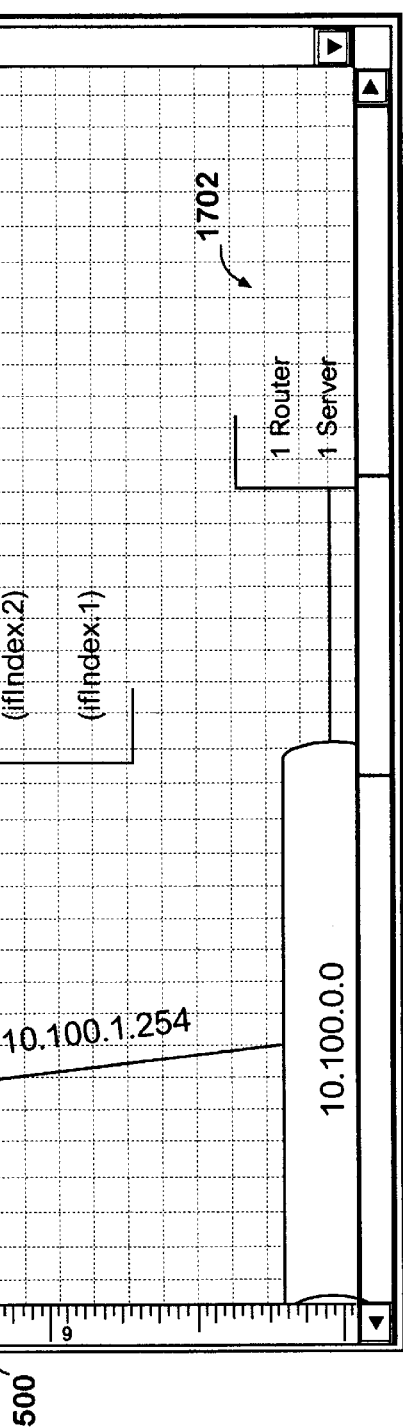
FIG. 20 is a display screen showing a list of interfaces associated with the device shape selected in FIG. 17.

Referring to FIG. 18, the facility 200 displays the drop-down menu 1202 when the user right-clicks on the router shape 1502. The drop-down menu 1202 includes a "List Interfaces" command 1802. By selecting the List Interfaces command 1802, the facility 200 displays a dialog box 1902 as shown in FIG. 19. The facility 200 queries the database for interfaces contained within the selected device (e.g. within the router), as shown in the dialog box 1902. The user can select one or more of the interfaces listed in the dialog box 1902, and the facility 200 displays the interface list in the diagram 1500. Thus, in response to input in the dialog box 1902, the facility 200 displays a list of the interfaces connected to the router shape 1502, as shown in FIG. 20. The facility 200 displays a list 2002 of serial link interfaces, for example, "(fIndex.1)." Additionally, the facility 200 displays two networks as cloud shapes 2004 and 2006, with corresponding addresses "10.61.0.0." and "10.62.0.0." as coupled to interfaces "10.61.1.2." and "10.62.1.1," all respectively.

The dialog box 1902 includes a section 1904 that allows the user to automatically connect PTP ("point to point") serial links and networks. A PTP serial link typically refers to a wire connecting two devices, such as a modem to modem connection. The options in Section 1904 affect how individual interfaces are displayed in the diagram 1500. If the "Networks" option is selected by the user, then the facility 200 displays a line connecting the interface to a small representation of the logical network (if sufficient data indicating such is in the database), as shown with the cloud shapes 2004 and 2006. Otherwise, no such cloud shape is added to the figure (as shown in FIG. 20). If the "PTP Serial Links" option is selected by the user, a shape of the element and the interface to which the selected interface is attached are placed in the diagram by the facility 200, with a line or other visual representation shown between the two connecting interfaces (not shown in FIG. 20). The dialog box 1902 also includes an option 1906 to allow the user to select the relative orientation of data displayed in the diagram 1500.

At any point, the user may print out a copy of the diagram currently displayed in the window, or store a copy of the diagram on any suitable computer readable media, using known printing and data storing techniques. Additionally, those skilled in the relevant art will appreciate, the diagram constructed by the user can, at any point, be sent over the network, such as the LAN 154 of FIG. 1 (alone or as an attachment to another document). The diagram can be uploaded to the remote computer 150, and converted to an appropriate format and transmitted over the Internet 156 as a HTTP document.

While options in lists of components are shown in the figures and described above as being in a particular form and appearance, those skilled in the relevant art will readily recognize that aspects of the invention can be carried out without such particulars. Moreover, additional details or options can be provided to the user. For example, the dialog box 1000 of FIG. 10 (or other dialog boxes,) can include options for a user to select particular formatting and display options, so that shapes automatically added to the diagram are automatically added in a particular aesthetic way. Furthermore, the facility 200 need not execute on one computer, such as the computer 100, but can be performed by one or more computers, including the remote computer 150 (FIG. 1).

Embodiments of the invention may be constructed using a variety of programming paradigms and tools, including well known approaches such as MICROSOFT ActiveX objects, MICROSOFT Automation, and the Common Object Request Broker Architecture ("CORBA"), used by companies such as IBM, Sun, and Apple. As is well known, CORBA allows objects from one program to communicate with objects in other programs even if the two programs are written in different programming languages and run on different computing platforms. The inventive method and system may be produced using any computing language, such as C, C++, Visual Basic ("VB"), Visual Basic Script ("VBScript"), Java, or JavaScript. Similarly, the inventive method and system may be developed according to an object-oriented programming methodology or using any other programming methodology that results in a computing system having equivalent functionality.

The invention is not limited to any particular operating system and may be used in computers having operating systems such as the WINDOWS operating system, Unix, Linux, OS/2, and the Macintosh operating system ("Mac OS").

The invention is not limited to any particular type of user interface and is suitable for operation with a user interface designed using the "what-you-see-is-what-you-get"

("WYSIWYG") display paradigm. One skilled in the art may easily recognize numerous alternative approaches to providing a user interface to receive the information needed to produce a diagram of a model.

Communications between aspects of the invention (e.g., communications between the Computer 100 and the remote computer 150) may be conducted over both a wireless communications system and a wired communications system.

According to one embodiment of the invention, Java applets may provide a plug-in model query page (e.g., the dialog box 1000) for use with an application on both a single computer and in a networked embodiment. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web.

A Java applet may be loaded and run by an already running Java application, such as a web browser. Java applets may be downloaded and run by any web browser capable of interpreting Java, such as Microsoft Internet Explorer, Netscape Navigator, and Hot Java.

Communications between a client web browser and a remote server application may be accomplished through a number of protocols, such as HTTP. Under embodiments of the invention, a remote computing system having browsing software may retrieve a model query page or a portion of the model database via Hypertext Markup Language ("HTML") documents, Dynamic Hypertext Mark-Up Language ("DHTML") documents, Extensible Mark-Up Language ("XML") documents, and/or other documents containing model query data and methods (objects) over the World Wide Web. Embodiments of the invention may operate with protocols and languages in addition to those specifically disclosed herein. For example, the web browser embodiment may use HTTP, HTML, DHTML, XML, UDP, TCP/IP, FTP, SNMP, and TFTP, as well as other similar languages and protocols.

The invention has been discussed in terms of computer programs but is equally applicable for systems utilizing hardware that performs similar functions, such as application specific integrated circuits ("ASICs").

The above description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other models, not necessarily the computer network model described above.

The various embodiments described above can be combined to provide further embodiments. All of the above U.S. patents and applications and User Manuals are incorporated herein by reference in their entireties. Aspects of the invention can be modified, if necessary, to employ the systems and concepts of the various patents and applications described above to provide yet further embodiments of the invention.

These and other changes can be made to the invention in light of the above detailed description. While certain embodiments are described above as automatically generating a diagram of computer network, the facility 200 can generate a diagram of any system comprised of components, where the system is represented as a model of logically connected elements in a database. For example, a database of personnel in an organization, where such personnel have associated logical connections, can be used by the facility 200 to generate an organizational chart. Likewise, the facility 200 can employ a database of a directory of services for users connected to one or more servers (such as the remote computer 150). The facility 200 may generate diagrams of users connected to the remote computer 150 based on logical connections of users to the server, as stored in the database. Additionally, while embodiments of the invention are described above as diagramming OSI layer-3 elements in a network, other elements could be diagrammed, such as network switches. These and other changes can be made to the invention in light of the above detailed description. In general, in the following claims, the terms used should not be construed to limit the invention to the specific embodiments disclosed in the specification and the claims, but should be construed to include all systems for diagramming models that operate under the claims to provide a method for efficiently diagramming such models. Accordingly, the invention is not limited by the disclosure, but instead the scope of the invention is to be determined entirely by the following claims.

I claim:

1. A computer controlled method of generating a diagram of a computer network system, comprising:

creating a database of a model of elements and their logical interconnections with an automatic network interrogation facility;

obtaining from the database the model of elements and their logical interconnections, wherein the model represents the computer network and the elements represent components of the computer network;

displaying a list of initial elements;

receiving input choosing an initial element from the list of elements and adding a shape representing the initial element to a diagram;

receiving input selecting the shape in the diagram and displaying options that are related to the selected shape;

receiving input selecting one of the options;

filtering data from the database to identify one or more elements related to the selected shape;

displaying a list of the one or more elements related to the selected shape and represented in the database as being connected to the element represented by the selected shape based upon the filtered data;

receiving input choosing one or more elements from the list; and adding to the diagram one or more shapes for the one or more elements chosen from the list, with connections to the selected shape.

2. The method of claim 1, further comprising:

displaying a list of element types;

receiving input choosing at least one element type from the list;

analyzing the database for a number of elements of the chosen type that are logically connected to the selected shape; and adding to the diagram an indication of the element type and the number of elements, visually associated with the selected shape.

3. The method of claim 1, further comprising:

displaying a list of interfaces represented in the database as being associated with the element represented by the selected shape;

receiving input choosing at least one interface from the list; and adding to the diagram an indication of the interface, visually associated with the selected shape.

4. The method of claim 1 wherein adding to the diagram one or more shapes includes adding a shape of a router having a known vendor-specific appearance, and wherein the shape of the router in the diagram represents the known appearance of the router.

5. A method in a computer system for generating a selective diagram of a system of connected nodes, comprising:

creating a model with an automatic interrogation facility;

retrieving the model representing the system;

filtering data from the model to identify one or more nodes connected to an initial node;

with respect to the initial node of the model, displaying a list of the nodes connected to the initial node in the model;

receiving user input selecting a displayed connected node; and generating a diagram showing the initial node connected to the selected node.

6. The method of claim 5 wherein retrieving includes retrieving a model of a computer network, and wherein the nodes are computer network components, and wherein generating includes generating a diagram showing connected network components.

7. The method of claim 5, further comprising:

displaying a list of node types;

receiving input choosing at least one node type from the list;

determining a number of nodes of the chosen type associated with the initial node; and adding to the diagram, visually associated with the initial node, an indication of the node type and the number of nodes.

8. The method of claim 5, further comprising:

displaying a list of interfaces associated with the initial node;

receiving input choosing at least one interface from the list; and adding to the diagram, visually associated with the initial node, an indication of the interface.

9. The method of claim 5 wherein generating includes adding a shape of a network component having a known physical appearance, and wherein the shape of the network component in the diagram represents the physical appearance of the network component.

10. The method of claim 5, further comprising:

receiving input selecting the selected node in the diagram and displaying options with respect to the selected node;

displaying a list of one or more nodes connected to the selected node.

11. The method of claim 5, further comprising receiving input selecting the selected node in the diagram and displaying options with respect to the selected node.

12. The method of claim 5 wherein displaying includes displaying formatting options for generating the diagram with respect to the selected node.

13. The method of claim 5 wherein retrieving includes retrieving a model of a personnel hierarchy, and wherein the nodes are personnel, and wherein generating includes generating a diagram showing connected personnel hierarchy.

14. The method of claim 5 wherein retrieving includes retrieving a model of users of at least one computer, and wherein the nodes are users of the computer, and wherein generating includes generating a diagram showing users connected to the computer.

15. The method of claim 5 wherein retrieving includes retrieving a model of a computer network, and wherein the nodes are computer network components, and wherein generating includes generating a diagram showing connected network components with associated logical addresses.

16. The method of claim 5 wherein retrieving includes retrieving at least a portion of a database storing a model of a network.

17. A computer-readable medium storing computer executable instructions, the instructions at least partially defining a method for generating a selective diagram of a system of connected nodes, the method comprising:

automatically generating a model;

retrieving the model representing the system;

filtering data from the model to identify one or more nodes connected to an initial node;

with respect to the initial node of the model, displaying a list of the one or more nodes connected to the initial node in the model;

receiving user input selecting a displayed connected node; and generating a diagram showing the initial node connected to the selected node.

18. The computer-readable medium of claim 17 wherein retrieving includes retrieving a model of a computer network, and wherein the nodes are computer network components, and wherein generating includes generating a diagram showing connected network components.

19. The computer-readable medium of claim 17, further comprising:

displaying a list of node types;

receiving input choosing at least one node type from the list;

determining a number of nodes of the chosen type associated with the initial node; and adding to the diagram an indication of the node type and the number of nodes, visually associated with the initial node.

20. The computer-readable medium of claim 17, further comprising:

displaying a list of interfaces associated with the initial node;

receiving input choosing at least one interface from the list; and adding to the diagram an indication of the interface, visually associated with the initial node.

21. The computer-readable medium of claim 17 wherein generating includes adding a shape of a network component having a known physical appearance, and wherein the shape of the network component in the diagram represents the physical appearance of the network component.

22. The computer-readable medium of claim 17, further comprising:

receiving input selecting the selected node in the diagram and displaying options with respect to the selected node;

displaying a list of one or more nodes connected to the selected node.

23. The computer-readable medium of claim 17, further comprising receiving input selecting the selected node in the diagram and displaying options with respect to the selected node.

24. The computer-readable medium of claim 17 wherein displaying includes displaying formatting options for generating the diagram with respect to the selected node.

25. The computer-readable medium of claim 17 wherein retrieving includes retrieving a model of a personnel hierarchy, and wherein the nodes are personnel, and wherein generating includes generating a diagram showing connected personnel hierarchy.

26. The computer-readable medium of claim 17 wherein retrieving includes retrieving a model of users of at least one computer, and wherein the nodes are users of the computer, and wherein generating includes generating a diagram showing users connected to the computer.

27. The computer-readable medium of claim 17 wherein retrieving includes retrieving a model of a computer network, and wherein the nodes are computer network components, and wherein generating includes generating a diagram showing connected network components with associated logical addresses.

28. The computer-readable medium of claim 17 wherein retrieving includes retrieving at least a portion of a database storing a model of a network.

29. A computer controlled method of generating a diagram of connected elements, comprising:
- automatically generating a model of elements and their logical interconnections;
- receiving at a first computer, the model of elements and their logical interconnections, wherein the model is stored at a second computer;
- at the first computer, filtering data from the model to identify one or more elements connected to an initial element;
- at the first computer, displaying a list of the one or more elements represented in the model as being connected to the initial element;
- at the first computer, receiving input choosing one or more elements from the list; and
- creating a diagram having one or more shapes representing the one or more elements chosen from the list, with connections to a shape representing the initial element.

30. The method of claim 29 wherein receiving includes retrieving a model of a computer network from the second computer, and wherein the elements are computer network components, and wherein creating includes generating, at the first computer, a diagram showing connected network components.

31. The method of claim 29, further comprising:
- at the first computer, displaying a list of element types;
- at the first computer, receiving input choosing at least one element type from the list;
- obtaining a number of elements of the chosen type associated with the initial element; and
- adding to the diagram, visually associated with the initial element, an indication of the element type and the number of elements.

32. The method of claim 29, further comprising:
- at the first computer, displaying a list of interfaces associated with the initial element;
- at the first computer, receiving input choosing at least one interface from the list; and
- adding to the diagram, visually associated with the initial element, an indication of the interface.

33. The method of claim 29, further comprising:
- at the first computer, receiving input selecting the initial element in the diagram and displaying options with respect thereto;
- displaying a list of one or more elements coupled to the selected element.

34. The method of claim 24, further comprising:
- at the first computer, receiving input selecting the initial element in the diagram and displaying options with respect thereto.

35. The method of claim 29 wherein receiving includes retrieving from the second computer a model of a computer network, and wherein the elements are computer network components, and wherein creating includes, at the first computer, generating a diagram showing connected network components with associated logical addresses.

36. The method of claim 29 wherein receiving includes retrieving at least a portion of a database storing a model of a network at the second computer.

37. A computer system for generating a diagram of connected elements, comprising:
- a computer-generated database containing a model of elements and their logical interconnections;
- a display screen; and
- a computer coupled to the display screen and the computer-generated database, wherein the computer is programmed to
  - filter data from the computer-generated database to identify one or more elements connected to an initial element;
  - cause the display screen to display a list of the one or more elements stored in the computer-generated database as being connected to the initial element;
  - receive input choosing one or more elements from the list; and
  - create a diagram, displayed on the display screen, having one or more shapes representing the one or more elements chosen from the list, with connections to a shape representing the initial element.

38. The system of claim 37 wherein the computer is coupled to the database through a network, wherein the model is a model of a computer network and the elements are computer network components, and wherein the computer generates a diagram showing connected network components.

39. The system of claim 37 wherein the computer is further programmed to display a list of element types, receive input choosing at least one element type from the list, obtain a number of elements of the chosen type associated with the initial element; and add to the diagram, visually associated with the initial element, an indication of the element type and the number of elements.

40. The system of claim 37 wherein the computer is further programmed to display a list of interfaces associated with the initial element, receive input choosing at least one interface from the list, and add to the diagram, visually associated with the initial element, an indication of the interface.

41. The system of claim 37 wherein the computer is further programmed to receive input selecting the initial element in the diagram and displaying options with respect thereto, and cause the display device to display a list of one or more elements coupled to the selected element.

42. The system of claim 37 wherein the computer is further programmed to receive input selecting the initial element in the diagram and case the display device to display options with respect thereto.

43. The system of claim 37 wherein the computer is further programmed to retrieve from a second computer a model of a network, wherein the elements are network components, and generate a diagram showing connected network components with associated logical addresses.

* * * * *

UNITED STATES PATENT AND TRADEMARK OFFICE
CERTIFICATE OF CORRECTION

PATENT NO. : 6,393,425 B1
DATED : May 21, 2002
INVENTOR(S) : Kelly

It is certified that error appears in the above-identified patent and that said Letters Patent is hereby corrected as shown below:

Column 3,
Line 67, change the word "bug" to the word -- bus --.

Column 5,
Line 65, change the word "enterpise" to -- enterprise --.

Column 12,
Line 40, between the word "are" and the word "related" insert the word -- only --; and after the word "shape" insert the phrase, -- , said options comprising operations that are only related to the selected shape that allow expansion of the diagram in a logical fashion --.
Line 44, between the word "elements" and the word "related" insert the following phrase -- that are only --.

Column 13,
Line 16, delete the phrase "one or more".
Line 16, between the words "nodes" and "connected" insert the word -- only --.
Line 20, after the word "model" insert the phrase -- that allow expansion of the diagram in a logical fashion --.

Column 14,
Line 19, delete the phrase "one or more".
Line 20, between the words "nodes" and "connected" insert the word -- only --.
Line 22, between the words "of" and "the" insert the word -- only --; and delete the phrase "one or more".
Line 23, after the word "model" insert the phrase -- that allow expansion of the diagram in a logical fashion --.

Column 15,
Line 29, between the words "elements" and "connected" insert the phrase -- that are only --.
Line 32, after the word "of " insert the word -- only --; and delete the phrase "the one or more".
Line 33, after the word "element" insert the phrase -- that allow expansion of a diagram in a logical fashion --.

UNITED STATES PATENT AND TRADEMARK OFFICE
CERTIFICATE OF CORRECTION

PATENT NO. : 6,393,425 B1
DATED : May 21, 2002
INVENTOR(S) : Kelly

It is certified that error appears in the above-identified patent and that said Letters Patent is hereby corrected as shown below:

Column 16,
Line 23, replace the phrase "one or more" with the word -- only --.
Line 24, between the words "of" and "the" insert the word -- only --; and delete the phrase "one or".
Line 25, delete the word "more".
Line 26, after the word "element" insert the phrase -- that allow expansion of the diagram in a logical fashion --.

Signed and Sealed this

Twelfth Day of November, 2002

Attest:

Attesting Officer

JAMES E. ROGAN
Director of the United States Patent and Trademark Office